US011292145B2

(12) United States Patent
Terada

(10) Patent No.: US 11,292,145 B2
(45) Date of Patent: Apr. 5, 2022

(54) BLADE CHANGER UNIT

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 336 days.

(21) Appl. No.: 16/751,478

(22) Filed: Jan. 24, 2020

(65) Prior Publication Data

US 2020/0238559 A1 Jul. 30, 2020

(30) Foreign Application Priority Data

Jan. 30, 2019 (JP) .............................. JP2019-014571

(51) Int. Cl.
*B26D 7/26* (2006.01)
*B27B 5/32* (2006.01)
*B23B 31/30* (2006.01)

(52) U.S. Cl.
CPC ......... *B26D 7/2621* (2013.01); *B26D 7/2635* (2013.01); *B27B 5/32* (2013.01); *B23B 31/307* (2013.01); *Y10T 83/173* (2015.04)

(58) Field of Classification Search
CPC . Y10T 83/7747; Y10T 83/173; Y10T 83/175; Y10T 83/18; Y10T 83/768; Y10T 83/7751; B26D 7/2621; B26D 7/2635; B26D 7/2614; B26D 7/26; B27B 5/32; B27B 5/29; B27B 5/30; B23B 31/307
See application file for complete search history.

(56) References Cited

U.S. PATENT DOCUMENTS

| 6,030,326 | A | * | 2/2000 | Azuma | ............. | B23Q 3/15722 |
| | | | | | | 483/30 |
| 2002/0069736 | A1 | * | 6/2002 | Yasoda | ................... | B26D 7/22 |
| | | | | | | 83/62.1 |
| 2004/0014408 | A1 | * | 1/2004 | Sekiya | .................. | B28D 5/022 |
| | | | | | | 83/886 |
| 2004/0149110 | A1 | * | 8/2004 | Kubota | ................. | B28D 5/022 |
| | | | | | | 83/663 |
| 2015/0020666 | A1 | * | 1/2015 | Wakita | ..................... | B27B 5/30 |
| | | | | | | 83/401 |

FOREIGN PATENT DOCUMENTS

JP          20160144838 A        8/2016

\* cited by examiner

*Primary Examiner* — Phong H Nguyen
(74) *Attorney, Agent, or Firm* — Greer Burns & Crain Ltd.

(57) ABSTRACT

A blade changer unit includes a blade chuck for holding a cutting blade, a moving unit for moving the blade chuck, and a control unit for controlling moving unit. The blade chuck has a plurality of electrically conductive grippers for holding the cutting blade. The controller detects conduction between the grippers and a boss. The control unit includes a calculator for calculating the position of a central axis of the mount from coordinates where the conduction between the holder and the boss is detected when the moving unit is controlled to bring the grippers into contact with the mount at at least three points, and a mounting/dismounting controller for mounting and dismounting the cutting blade while the central axis of the blade chuck is aligned with the central axis of the mount calculated by the calculator.

5 Claims, 18 Drawing Sheets

BLADE CHANGER UNIT

BACKGROUND OF THE INVENTION

Field of the Invention

The present invention relates to a blade changer unit that detects the center of a mount in order to align the blade changer unit and the mount with each other in a processing apparatus that includes a mechanism for automatically changing cutting blades.

Description of the Related Art

For cutting workpieces such as semiconductor wafers or the like, a cutting apparatus including cutting blades is used as a processing apparatus (see, for example, JP 2016-144838A). For the cutting apparatus to operate continuously needs to automatically supply cutting blades as expendable tools to the cutting apparatus.

The cutting apparatus disclosed in JP 2016-144838A includes a blade rack for holding a plurality of cutting blades and a blade changer unit for changing cutting blades on a cutting unit.

SUMMARY OF THE INVENTION

The blade changer unit of the cutting apparatus disclosed in JP 2016-144838A is required to perform a process of aligning the center of a mount and the center of a holder that holds a cutting blade in the blade changer unit with each other so as to mount and dismount cutting blades properly.

Even after the conventional cutting apparatus has carried out the above positional alignment, the center of the mount and the center of the holder in the blade changer unit may become positionally misaligned due to the effect of heat, collisions of parts, etc. In the event of such a positional misalignment, the center of the mount and the center of the holder have to be adjusted again into alignment with each other.

However, the blade changer unit disclosed in JP 2016-144838A requires the operator to perform a tedious and time-consuming process involving visual and tactile senses in order to determine the position of the center of the mount.

It is therefore an object of the present invention to provide a blade changer unit that is capable of easily determining the position of a mount on which to mount a cutting blade.

In accordance with an aspect of the present invention, there is provided a blade changer unit for mounting a cutting blade on and dismounting the cutting blade from a boss extending in an axial direction from a mount fixed to a distal end of a spindle of a processing apparatus, the cutting blade including a circular base having an insertion hole defined centrally therein and a cutting edge disposed on an outer circumferential edge portion of the circular base, the blade changer unit including an electrically conductive holder for holding the cutting blade, a moving unit for moving the blade changer unit, and a control unit for controlling the moving unit and detecting conduction between the holder and the boss, in which the control unit includes a calculator for calculating a center of the mount from coordinates where the conduction between the holder and the boss is detected when the moving unit is controlled to bring the holder into contact with the mount at at least three points, and a mounting/dismounting controller for mounting and dismounting the cutting blade while a center of the holder is aligned with the center of the mount calculated by the calculator.

Preferably, the mount has a bearing flange projecting radially outwardly from a rear end of the boss in an axial direction thereof, for supporting the cutting blade, the spindle has an axial direction as a Y-axis direction, the calculator calculates coordinates in the Y-axis direction of the boss from the coordinates where the conduction between the holder and the boss is detected when the holder is brought into contact with the boss or a distal end of the bearing flange at at least one point, and the mounting/dismounting controller mounts and dismounts the cutting blade in alignment with the coordinates in the Y-axis direction of the boss calculated by the calculator.

In accordance with another aspect of the present invention, there is provided a blade changer unit for mounting a cutting blade, the cutting blade including a circular base having an insertion hole defined centrally therein and a cutting edge disposed on an outer circumferential edge portion of the circular base, on and dismounting the cutting blade, from a boss extending in an axial direction from a mount fixed to a distal end of a spindle of a processing apparatus, the blade changer unit including an electrically conductive holder for holding an electrically conductive jig having an opening larger than the boss, a moving unit for moving the blade changer unit, and a control unit for controlling the moving unit and detecting conduction between the holder and the boss, in which the control unit includes a calculator for calculating a center of the mount from coordinates where the conduction between the holder and the boss is detected when the moving unit is controlled to bring the jig held by the holder into contact with the mount at at least three points, and a mounting/dismounting controller for mounting and dismounting the cutting blade while a center of the holder is aligned with the center of the mount calculated by the calculator.

Preferably, the mount has a bearing flange projecting radially outwardly from a rear end of the boss in an axial direction thereof, for supporting the cutting blade, the spindle has an axial direction as a Y-axis direction, the calculator calculates coordinates in the Y-axis direction of the boss from the coordinates where the conduction between the holder and the boss is detected when the jig is brought into contact with the boss or a distal end of the bearing flange at at least one point, and the mounting/dismounting controller mounts and dismounts the cutting blade in alignment with the coordinates in the Y-axis direction of the boss calculated by the calculator.

Preferably, the jig includes the cutting blade.

According to the present invention, the blade changer unit is able to determine with ease the position of the center of the mount on which to mount a cutting blade.

The above and other objects, features, and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will hereinafter be described in detail below with reference to the drawings. The present invention is not limited to the details of the embodiments described below. The components described below cover those which could easily be envisaged by those skilled in the art and those which are essentially identical to those described above. Furthermore, the arrangements described below can be used in appropriate combinations. Various omissions, replacements, or changes of the arrangements may be made without departing from the scope of the present invention.

First Embodiment

Figure 1:
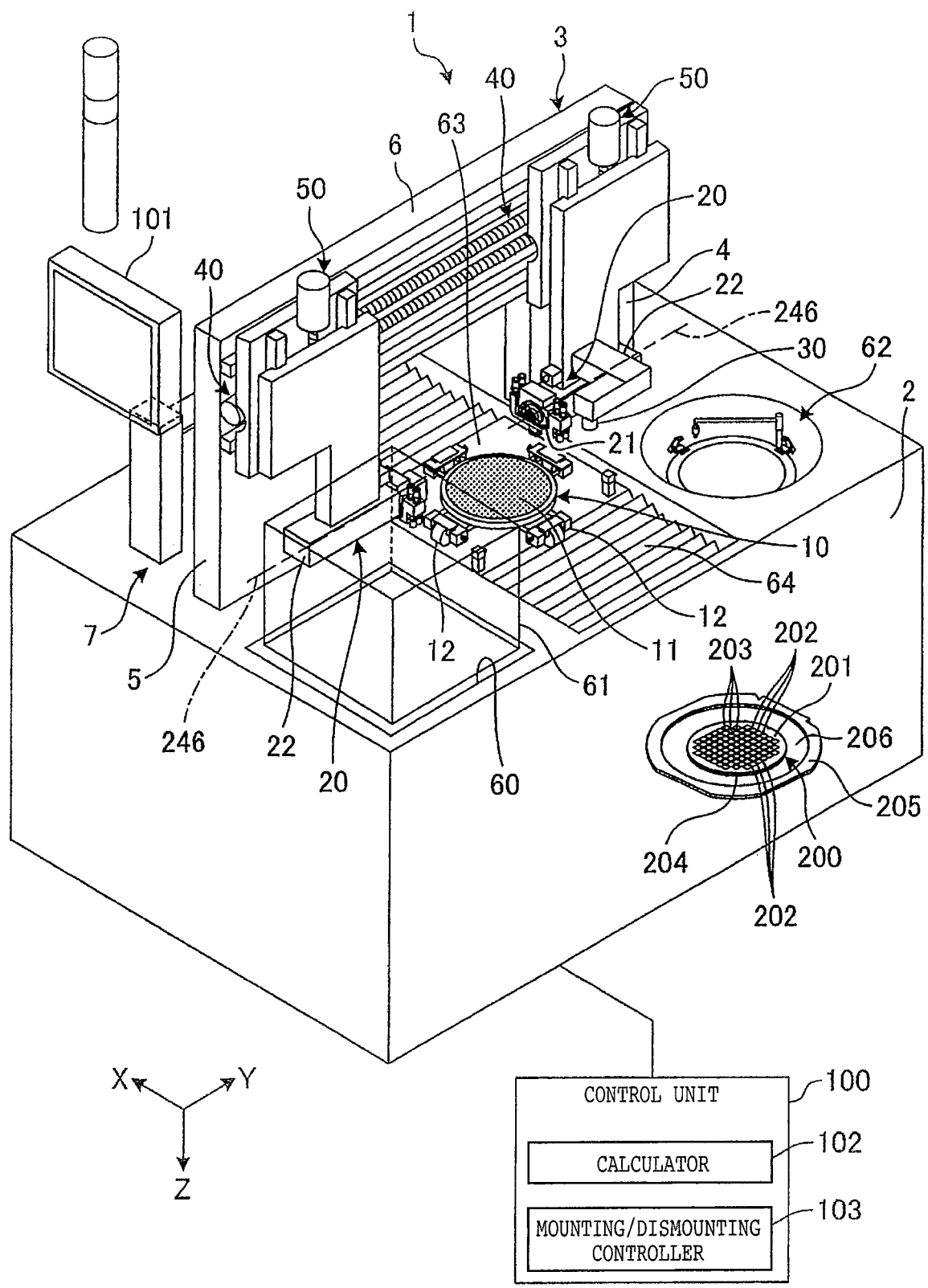
FIG. 1 is a perspective view illustrating by way of example the structure of a cutting apparatus incorporating a blade changer unit according to a first embodiment of the present invention.
Figure 2:
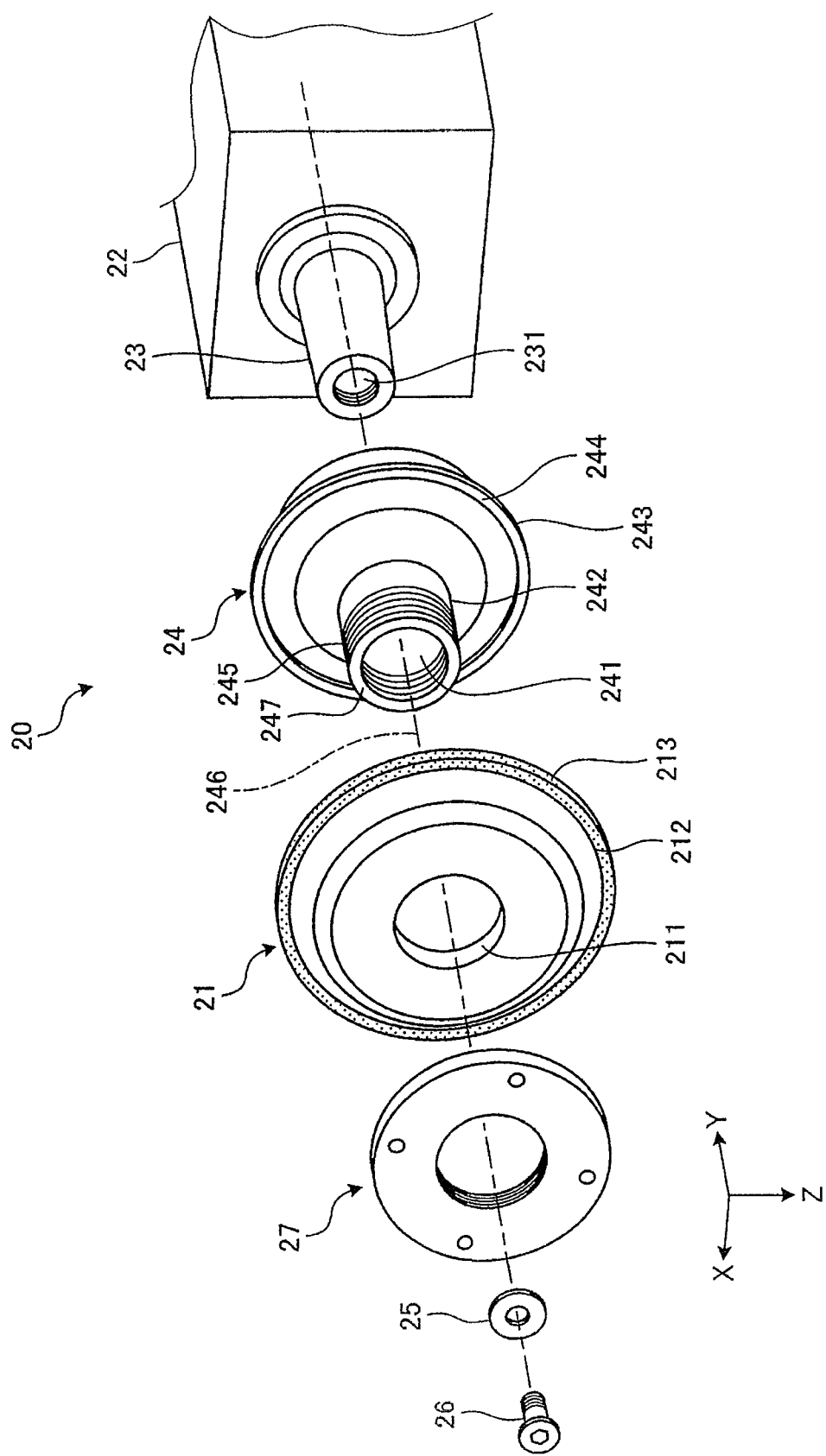
FIG. 2 is an exploded perspective view of a cutting unit of the cutting apparatus illustrated in FIG. 1.
Figure 3:
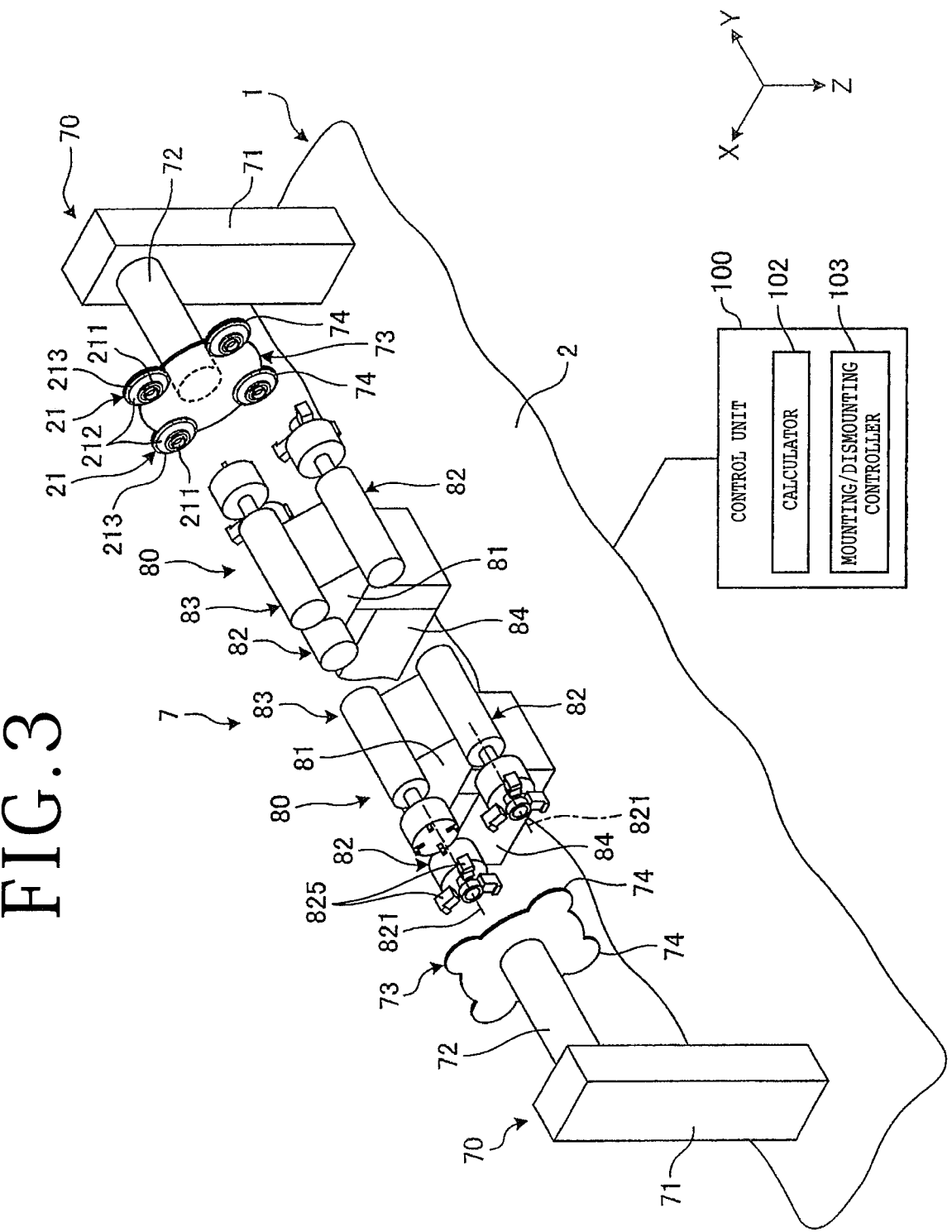
FIG. 3 is an exploded perspective view illustrating by way of example the structure of the blade changer unit of the cutting apparatus illustrated in FIG. 1.

A blade changer unit according to a first embodiment of the present invention will be described below with reference to the drawings. FIG. 1 illustrates in perspective by way of example the structure of a cutting apparatus incorporating the blade changer unit according to the first embodiment of the present invention. FIG. 2 illustrates in exploded perspective a cutting unit of the cutting apparatus illustrated in FIG. 1. FIG. 3 illustrates in exploded perspective by way of example the structure of the blade changer unit of the cutting apparatus illustrated in FIG. 1.

(Cutting Apparatus)

The blade changer unit, denoted by 7, according to the first embodiment is incorporated in the cutting apparatus, denoted by 1, illustrated as a processing apparatus in FIG. 1. The cutting apparatus 1 is an apparatus for cutting, i.e., processing, a workpiece 200 illustrated in FIG. 1. According to the first embodiment, the workpiece 200 is in the form of a wafer such as a disk-shaped semiconductor wafer, an optical wafer, or the like made of silicon, sapphire, gallium, or the like. The workpiece 200 has a face side 201 demarcated into a grid of areas by a grid of projected dicing lines 202 and a plurality of devices 203 formed respectively in the areas.

According to the present invention, the workpiece 200 may be what is generally called a TAIKO (registered trademark) wafer having a thin central region and a thicker region on its outer circumferential portion, or a rectangular package substrate, ceramic substrate, or ferrite substrate having a plurality of resin-encapsulated devices thereon, a substrate containing at least one of nickel and iron, or the like. According to the first embodiment, the workpiece 200 has a reverse side 204 stuck to an adhesive tape 206 having an outer circumferential edge portion on which an annular frame 205 is mounted, so that the workpiece 200 is supported on the annular frame 205.

The cutting apparatus 1 illustrated in FIG. 1 is an apparatus for holding the workpiece 200 on a chuck table 10 and cutting, i.e., processing, the workpiece 200 with a cutting blade 21 along the projected dicing lines 202. As illustrated in FIG. 1, the cutting apparatus 1 includes the chuck table 10 that holds the workpiece 200 under suction on a holding surface 11 thereof, a pair of cutting units 20 that each cuts the workpiece 200 held on the chuck table 10 with the cutting blade 21, an image capturing unit 30 that captures an image of the workpiece 200 held on the chuck table 10, and the blade changer unit 7.

As illustrated in FIG. 1, the cutting apparatus 1 also includes at least an X-axis moving unit, not illustrated, for processing-feeding the chuck table 10 in an X-axis direction parallel to a horizontal direction, a Y-axis moving unit 40 for indexing-feeding the cutting unit 20 in a Y-axis direction parallel to a horizontal direction and perpendicular to the X-axis direction, and a pair of Z-axis moving units 50 for cutting-feeding the respective cutting units 20 in a Z-axis direction parallel to a vertical direction and perpendicular to both the X-axis direction and the Y-axis direction. As illustrated in FIG. 1, the cutting apparatus 1 is a two-spindle dicer, i.e., what is generally called a facing dual-type cutting apparatus, having the two cutting units 20.

The chuck table 10 is disk-shaped and the holding surface 11 thereof for holding the workpiece 200 thereon is made of porous ceramics or the like. The chuck table 10 is movable by the X-axis moving unit along the X-axis direction between a processing area 63 beneath the cutting unit 20 and a loading/unloading area 64, spaced from the processing area 63, where the workpiece 200 is loaded onto and unloaded from the chuck table 10. The chuck table 10 is also rotatable about a central axis parallel to the Z-axis direction by a rotary actuator, not illustrated. The chuck table 10 is connected to a vacuum suction source, not illustrated, and attracts and holds the workpiece 200 on the holding surface 11 under a vacuum developed by the vacuum suction source. According to the first embodiment, the chuck table 10 attracts and holds the reverse side 204 of the workpiece 200 with the adhesive tape 206 interposed therebetween. As illustrated in FIG. 1, a plurality of clamps 12 for clamping the annular frame 205 are disposed around the chuck table 10.

Each of the cutting units 20 acts as cutting means with the cutting blade 21 removably mounted thereon for cutting the workpiece 200 held on the chuck table 10. The cutting unit 20 is movable with respect to the workpiece 200 held on the chuck table 10 in the Y-axis direction by the Y-axis moving unit 40 and in the Z-axis direction by the Z-axis moving unit 50.

As illustrated in FIG. 1, one of the cutting units 20 is supported on one post 4 of a portal-shaped support frame 3 erected on an apparatus body 2 through the Y-axis moving unit 40 and one of the Z-axis moving units 50. Similarly, the other cutting unit 20 is supported on another post 5 of the support frame 3 through the Y-axis moving unit 40 and the other Z-axis moving unit 50. The support frame 3 also includes a horizontal beam 6 interconnecting respective upper end portions of the posts 4 and 5.

The cutting units 20 are enabled by the Y-axis moving unit 40 and the Z-axis moving units 50 to position their cutting blades 21 at any desired positions over the holding surface 11 of the chuck table 10.

As illustrated in FIG. 2, each of the cutting units 20 includes a spindle housing 22 movable in the Y-axis direction and the Z-axis direction respectively by the Y-axis moving unit 40 and the Z-axis moving unit 50, a spindle 23 rotatably disposed in the spindle housing 22 and rotatable about its own central axis by an electric motor, not illustrated, and a mount 24 mounted on a distal end portion of the spindle 23. The cutting unit 20 also includes a fixing screw 26 extending through a washer 25 and a through hole 241 defined centrally in the mount 24 and threaded into a screw hole 231 defined in a distal end face of the spindle 23 to fix the mount 24 to the distal end portion of the spindle 23, the cutting blade 21 mounted on the mount 24, and a fastening nut 27 fixing the cutting blade 21 to the mount 24 while sandwiching the cutting blade 21 between itself and the mount 24.

The mount 24 is fixed to the distal end portion of the spindle 23. The mount 24 includes a hollow cylindrical boss 242 and a bearing flange 243 disposed on the boss 242 at an end thereof, i.e., an axially rear end thereof, closer to the spindle housing 22. The boss 242 extends along axial directions of the mount 24 and has an outside diameter substantially equal along its entire length to the inside diameter of an insertion hole 211 defined in the cutting blade 21. That the outside diameter of the boss 242 is substantially equal to the inside diameter of the insertion hole 211 means that the outside diameter and inside diameter are the same as each other to the extent that an outer circumferential surface of the boss 242 and an inner circumferential surface of the cutting blade that defines the insertion hole 211 are able to contact each other at at least a plurality of contact points.

The bearing flange 243 is of an annular shape projecting radially outwardly from the end of the boss 242 closer to the spindle housing 22 and having an outside diameter larger than the outside diameter of the boss 242. The bearing flange 243 supports the cutting blade 21 on an outer edge portion 244 thereof at its distal end. The boss 242 and the bearing flange 243 are disposed coaxially with each other. The boss 242 of the mount 24 has another end portion, remote from the spindle housing 22, having an externally threaded outer circumferential surface 245.

The cutting blade 21 is in the form of an ultrathin cutting grinding stone that is of an essentially ring shape. According to the first embodiment, the cutting blade 21 is what is generally called a hub blade including an annular circular base 212 made of electrically conductive metal and having the insertion hole 211 defined centrally therein, and an annular cutting edge 213 that is disposed on an outer circumferential edge portion of the circular base 211 and cuts the workpiece 200. The insertion hole 211 defined in the circular base 212 is a hole through which the other end portion of the boss 242 extends to mount the cutting blade 21 on the mount 24. The cutting edge 213 is made of abrasive grains made of diamond, cubic boron nitride (CBN), or the like and a bonding material, i.e., a binder, made of metal, resin, or the like, and has a predetermined thickness. According to the present invention, the cutting blade 21 may be a washer blade that has only the cutting edge 213.

The cutting blade 21 thus constructed is fitted over the hollow cylindrical boss 242 of the mount 24 that extends through the insertion hole 211 in the circular base 212. The cutting blade 21 is sandwiched between and fixed in position by the bearing flange 243 of the mount 24 and the fastening nut 27 that is threaded over the externally threaded outer circumferential surface 245 of the boss 242.

The spindle 23 of the cutting unit 20, the mount 24, and the cutting blade 21 have a central axis 246 parallel to the Y-axis direction. According to the first embodiment, at least the spindle 23 and the mount 24 are made of an electrically conductive material, i.e., metal according to the first embodiment. According to the first embodiment, the central axis 246 of the spindle 23, the mount 24, and the cutting blade 21 extends parallel to the Y-axis direction.

The image capturing unit 30 is fixed to one of the cutting units 20 for movement in unison therewith. The image capturing unit 30 includes an image capturing device for capturing an image of an area to be divided of the workpiece 200 held on the chuck table 10 before the workpiece 200 is cut. The image capturing device may be a charge-coupled device (CCD) image sensor or a complementary metal-oxide-silicon (CMOS) image sensor, for example. The image capturing unit 30 captures an image of the workpiece 200 held on the chuck table 10 for use in an alignment process for positioning the workpiece 200 and the cutting blade 21 in alignment with each other, and outputs the captured image to a control unit 100 for the blade changer unit 7.

The X-axis moving unit moves the chuck table 10 in the X-axis direction as a processing-feed direction, thereby processing-feeding the chuck table 10 and the cutting units 20 along the X-axis direction relatively to each other. The Y-axis moving unit 40 moves the cutting units 20 in the Y-axis direction as an indexing-feed direction, thereby indexing-feeding the chuck table 10 and the cutting units 20 along the Y-axis direction relatively to each other. The Z-axis moving unit 50 moves the cutting units 20 in the Z-axis direction as a cutting-feed direction, thereby cutting-feeding the chuck table 10 and the cutting units 20 along the Z-axis direction relatively to each other.

Each of the X-axis moving unit, the Y-axis moving unit 40, and the Z-axis moving unit 50 includes a known ball screw rotatable about its own central axis, a known electric motor for rotating the ball screw about its own central axis, and a pair of guide rails on which the chuck table 10 or the cutting units 20 are movably supported for movement in the X-axis direction, the Y-axis direction, or the Z-axis direction.

The cutting apparatus 1 further includes an X-axis direction position detecting unit, not illustrated, for detecting the position of the chuck table 10 in the X-axis direction, a Y-axis direction position detecting unit, not illustrated, for detecting the positions of the cutting units 20 in the Y-axis direction, and a Z-axis direction position detecting unit, not illustrated, for detecting the positions of the cutting units 20 in the Z-axis direction. Each of the X-axis direction position detecting unit and the Y-axis direction position detecting unit may include a linear scale parallel to the X-axis direction or the Y-axis direction and a reading head. The Z-axis direction position detecting unit may detect the positions of the cutting units 20 in the Z-axis direction on the basis of pulses of the electric motors. The X-axis direction position detecting unit, the Y-axis direction position detecting unit, and the Z-axis direction position detecting unit output the position of the chuck table 10 in the X-axis direction and the positions of the cutting units 20 in the Y-axis direction and the Z-axis direction to the control unit 100. According to the first embodiment, the positions of components of the cutting apparatus 1 in the X-axis direction, the Y-axis direction, and the Z-axis direction are determined as positions with reference to predetermined reference positions, not illustrated.

The cutting apparatus 1 also includes a cassette elevator 60 for placing thereon a cassette 61 that houses workpieces 200 which are to be cut and have been cut and moving the cassette 61 in the Z-axis direction, a cleaning unit 62 for cleaning workpieces 200 which have been cut, and a feed unit, not illustrated, for taking workpieces 200 into and out of the cassette 61 and feeding workpieces 200.

(Blade Changer Unit)

The blade changer unit 7 mounts a cutting blade 21 on or dismounts a cutting blade 21 from the boss 242 of the mount 24 fixed to the distal end portion of the spindle 23 of each of the cutting units 20 that is positioned in a mounting/dismounting position. The mounting/dismounting position is a predetermined position in the X-axis direction, the Y-axis direction, and the Z-axis direction, where each of the cutting units 20 is positioned for mounting or dismounting a cutting blade 21 with the blade changer unit 7.

As illustrated in FIG. 1, the blade changer unit 7 is disposed behind the support frame 3 in a position that is more spaced from the loading/unloading area 64 than the processing area 63. As illustrated in FIG. 3, the blade changer unit 7 includes blade stockers 70 for holding cutting blades 21 that are to be changed and that have been changed, blade mounting/dismounting units 80 for mounting cutting blades 21 on and dismounting cutting blades 21 from the spindles 23 of the respective cutting units 20 and delivering cutting blades 21 between the blade stockers 70 and the cutting units 20, and the control unit 100.

According to the first embodiment, the blade stockers 70 and the blade mounting/dismounting units 80 are associated with each other in pairs, and are also associated with the cutting units 20 in pairs. In other words, the blade changer unit 7 includes a pair of blade stockers 70 and a pair of blade mounting/dismounting units 80.

According to the first embodiment, one of the blade stockers 70 holds a plurality of cutting blades 21 that are to be mounted on and that have been dismounted from the spindle 23 of one of the cutting units 20. One of the blade mounting/dismounting units 80 mounts a cutting blade 21 on or dismounts a cutting blade 21 from one of the cutting units 20 and delivers cutting blades 21 between one of the blade stockers 70 and one of the cutting units 20. According to the first embodiment, the other of the blade stockers 70 holds a plurality of cutting blades 21 that are to be mounted on and that have been dismounted from the spindle 23 of the other of the cutting units 20. The other of the blade mounting/dismounting units 80 mounts a cutting blade 21 on or dismounts a cutting blade 21 from the other of the cutting units 20 and delivers cutting blades 21 between the other of the blade stockers 70 and the other of the cutting units 20.

The cutting blades 21 that are held by each of the blade stockers 70 include cutting blades not yet in use, cutting blades already used but still usable as their service life has not been ended, cutting blades of one type and/or different types.

Next, each of the components of the blade changer unit 7 will be described below.

(Blade Stocker)

Figure 4:
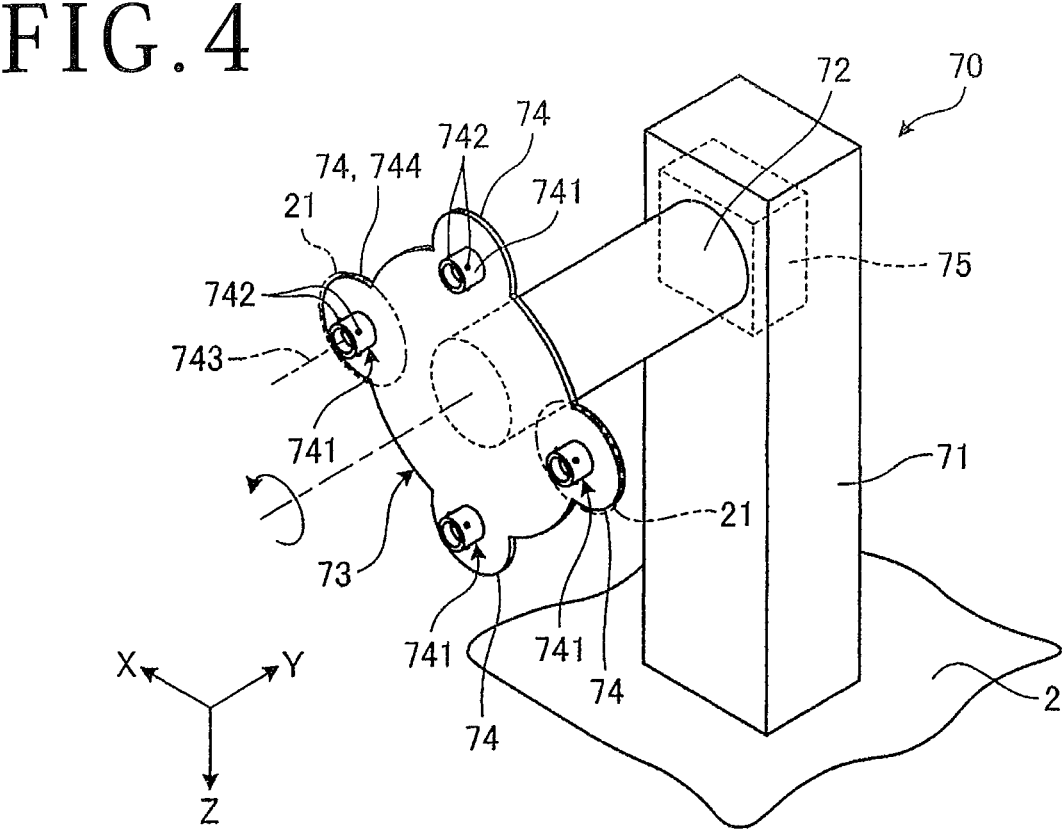
FIG. 4 is a perspective view illustrating by way of example the structure of a blade stocker of the blade changer unit illustrated in FIG. 3.
Figure 5:
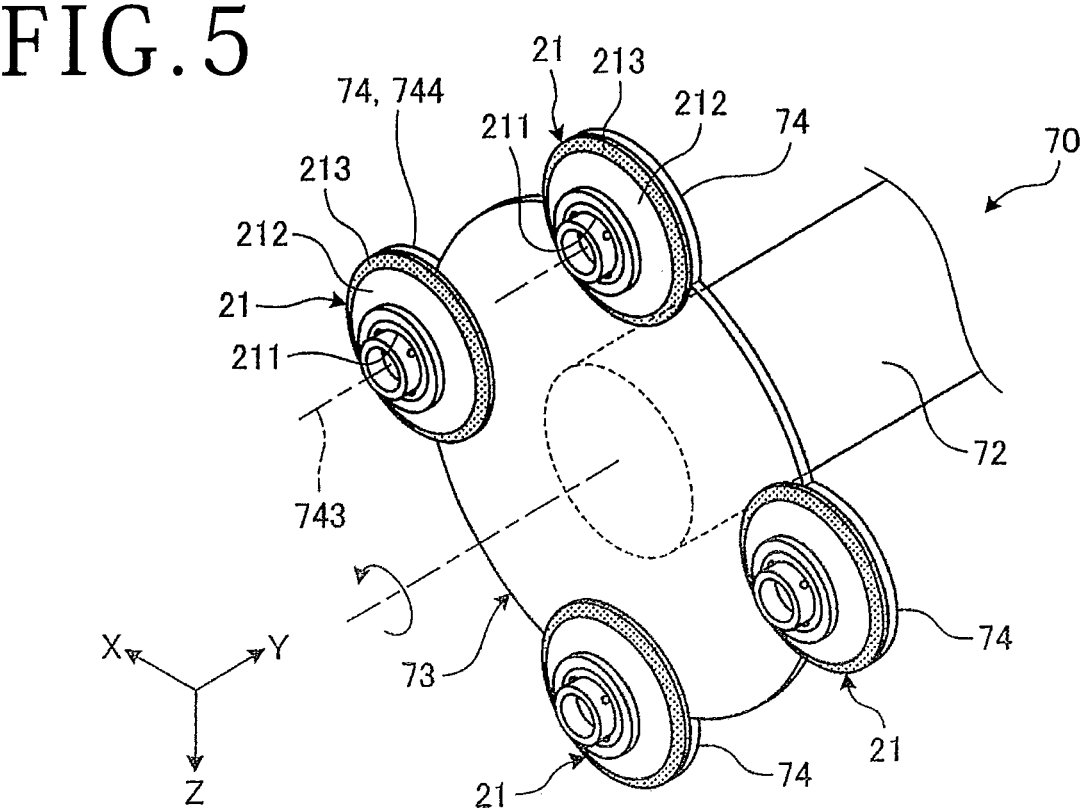
FIG. 5 is a perspective view illustrating the manner in which the blade stocker illustrated in FIG. 4 holds a plurality of cutting blades.

FIG. 4 illustrates in perspective by way of example the structure of one of the blade stockers 70 of the blade changer unit 7 illustrated in FIG. 3. FIG. 5 illustrates in perspective the manner in which the blade stocker 70 illustrated in FIG. 4 holds a plurality of cutting blades 21.

The blade stocker 70 holds replacement cutting blades 21 to be mounted on the corresponding cutting unit 20 and replaced cutting blades 21 that have been dismounted from the corresponding cutting unit 20. Since the two blade stockers 70 are structurally identical to each other, only the blade stocker 70 that is illustrated on the far side in FIG. 3 will be described as a representative one. Those parts of the other blade stocker 70 that are identical to those of the representative blade stocker 70 are denoted by identical reference characters and will not be described in detail below.

As illustrated in FIGS. 3 and 4, the blade stocker 70 includes a post 71 disposed on the apparatus body 2 and a support member 73 mounted on an upper end portion of the post 71 by a rotational shaft 72. The support member 73 is disposed in facing relation to the corresponding blade mounting/dismounting unit 80 along the Y-axis direction. The support member 73 has a plurality of, i.e., four in the first embodiment, blade holders 74 concentrically disposed on a face side thereof that faces the corresponding blade mounting/dismounting unit 80, for holding a plurality of, i.e., four in the first embodiment, cutting blades 21 that are to be mounted on and that have been dismounted from the corresponding cutting unit 20.

Each of the blade holders 74 holds a cutting blade 21 thereon. The blade holder 74 includes a hollow cylindrical blade fitting member 741 to be inserted in the insertion hole 211 in the cutting blade 21 and a plurality of positioning members 742 disposed on an outer circumferential surface of the blade fitting member 741, for positioning the cutting blade 21 after the blade fitting member 741 has been inserted in the insertion hole 211 thereof. Each of the positioning members 742 includes a ball that can protrude from and retract into the outer circumferential surface of the blade fitting member 741 and a spring for normally biasing the ball radially outwardly. When the cutting blade 21 is placed on the blade holder 74, the ball fits with an inner edge of the circular base 212 until a radially inward force acting on the ball becomes a predetermined value, thereby performing a positioning function to position the cutting blade 21 on the blade holder 74.

The blade stocker 70 thus constructed holds cutting blades 21 as illustrated in FIG. 5. Specifically, when the blade fitting member 741 is inserted into the insertion hole 211 in the circular base 212 of the cutting blade 21, the ball retracts into the blade fitting member 741. When the cutting blade 21 rides over the ball, the ball springs back and protrudes from the outer circumferential surface of the blade fitting member 741, fitting with the inner edge of the circular base 212 thereby to hold the cutting blade 21, as illustrated in FIG. 5. According to the first embodiment, the blade fitting member 741 has a central axis 743 parallel to the Y-axis direction.

The rotational shaft 72 by which the support member 73 is mounted on the upper end portion of the post 71 has an end disposed on the upper end portion of the post 71 and the other end coupled to a reverse side of the support member 73. The end of the rotational shaft 72 that is disposed on the upper end portion of the post 71 is coupled to the drive shaft of an electric motor 75 disposed in the post 71. The support member 73 is intermittently rotatable about the central axis of the rotational shaft 72 by the rotational shaft 72. When the support member 73 is intermittently rotated by the rotational shaft 72, the support member 73 selectively positions one at a time of the blade holders 74 in a preset transfer position 744 on their orbital path.

(Blade Mounting/Dismounting Unit)

Figure 6:
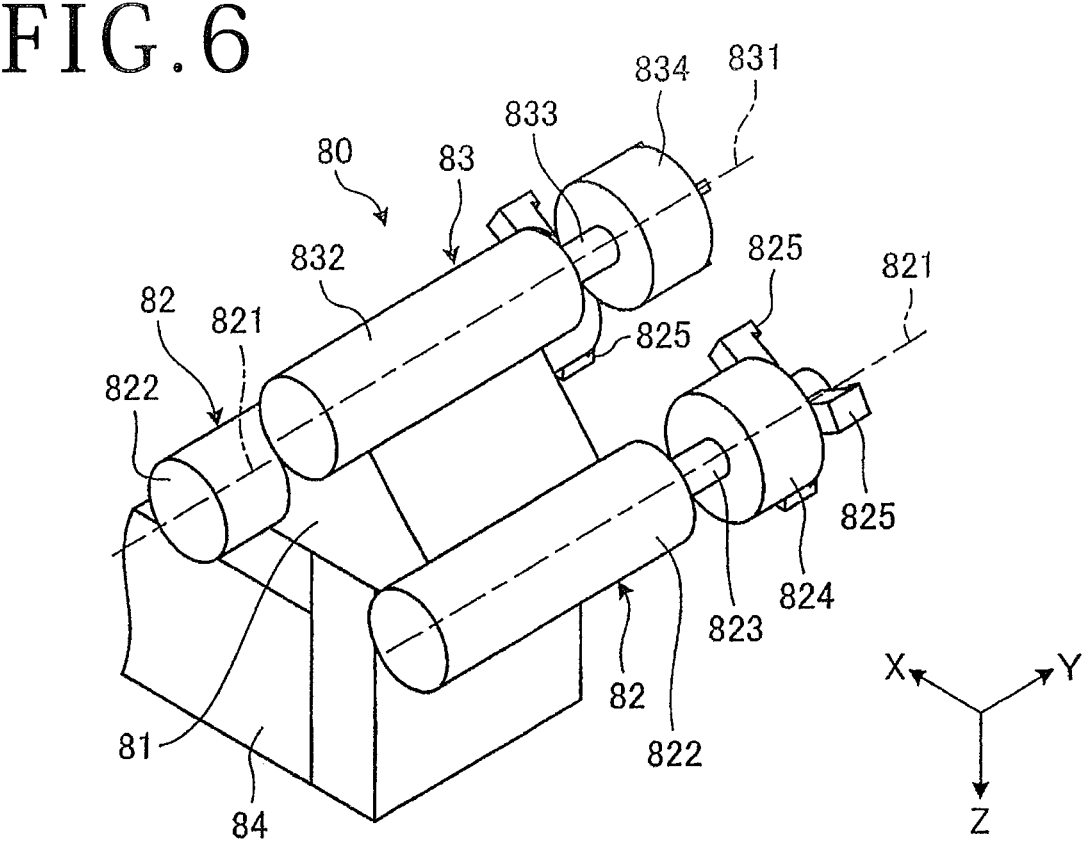
FIG. 6 is a perspective view illustrating by way of example the structure of a blade mounting/dismounting unit of the blade changer unit illustrated in FIG. 3.
Figure 7:
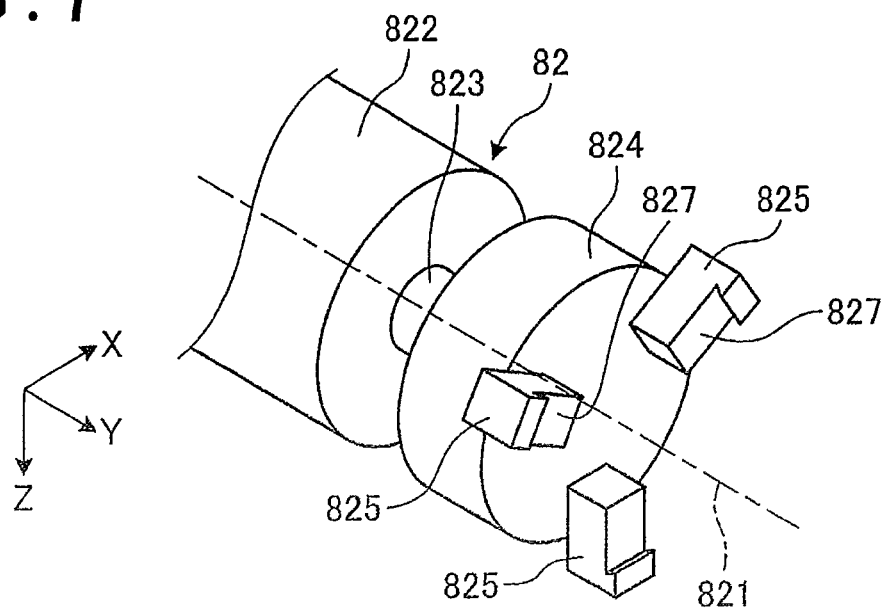
FIG. 7 is a perspective view illustrating by way of example the structure of a blade chuck of the blade mounting/dismounting unit illustrated in FIG. 6.
Figure 8:
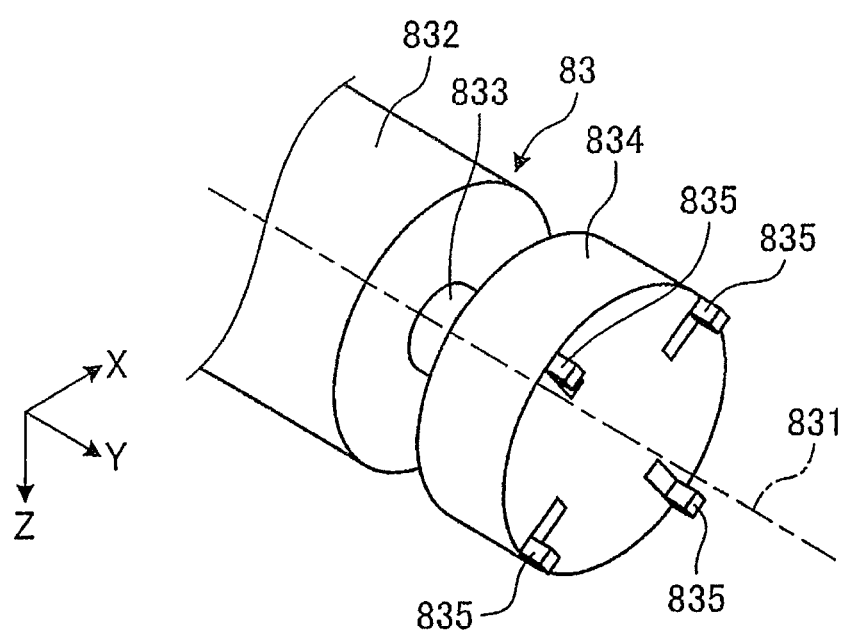
FIG. 8 is a perspective view illustrating by way of example the structure of a nut holder of the blade mounting/dismounting unit illustrated in FIG. 6.

FIG. 6 illustrates in perspective by way of example the structure of the blade mounting/dismounting unit 80 of the blade changer unit 7 illustrated in FIG. 3. FIG. 7 illustrates in perspective by way of example the structure of a blade chuck of the blade mounting/dismounting unit 80 illustrated in FIG. 6. FIG. 8 illustrates in perspective by way of example the structure of a nut holder of the blade mounting/dismounting unit 80 illustrated in FIG. 6.

Since the two blade mounting/dismounting units 80 are structurally identical to each other, only the blade mounting/dismounting unit 80 that is illustrated on the far side in FIG. 3 will be described as a representative one. Those parts of the other blade mounting/dismounting unit 80 that are identical to those of the representative blade stocker 70 are denoted by identical reference characters and will not be described in detail below.

As illustrated in FIG. 6, the blade mounting/dismounting unit 80 includes a unit body 81, blade chucks 82, a nut holder 83, and a moving unit 84 that movingly supports the unit body 81. According to the first embodiment, the blade mounting/dismounting unit 80 includes two blade chucks 82 and one nut holder 83.

The blade chucks 82 and the nut holder 83 are mounted on the unit body 81 and have respective central axes 821 and 831 angularly spaced from each other and extending parallel to each other. According to the first embodiment, the central axes 821 of the blade chucks 82 and the central axis 831 of the nut holder 83 extend parallel to the Y-axis direction.

The blade chucks 82 hold respective cutting blades 21 thereon. As illustrated in FIG. 7, each of the blade chucks 82 includes a casing 822 fixed to the unit body 81 and having a hollow cylindrical appearance, a disk-shaped support base 824 mounted on a distal end of the casing 822 by an arm 823, and a plurality of grippers 825 attached to the support base 824.

The grippers 825 are circumferentially spaced from each other on an outer edge portion of an end face of the support base 824 that faces the blade holders 74 of the corresponding blade stocker 70. According to the first embodiment, there are three grippers 825 disposed at circumferentially equally spaced intervals on the outer edge portion of the end face of the support base 824. The grippers 825 are movable radially on the end face of the support base 824 by a drive mechanism, not illustrated, housed in the support base 824. When the grippers 825 are moved radially inwardly toward each other, they grip the outer circumferential surface of the circular base 212 of a cutting blade 21. When the grippers 825 are moved radially outwardly away from each other, they release the cutting blade 21. The grippers 825 are made of an electrically conductive material, e.g., metal in the first embodiment. The grippers 825 act as electrically conductive holders for holding a cutting blade 21.

The nut holder 83 mounts a fastening nut 27 on and dismounts a fastening nut 27 from a boss 242. As illustrated in FIG. 8, the nut holder 83 includes a casing 832 fixed to the unit body 81 and having a hollow cylindrical appearance, a spindle 833 housed in the casing 832 and rotatable about a central axis 831 parallel to the Y-axis direction, a disk-shaped support base 834 fixed to an end of the spindle 833, and a plurality of grippers 835 attached to the support base 834.

The spindle 833 has an end projecting from the casing 832 toward the corresponding blade stocker 70. The spindle 833 has another end coupled to an electric motor, not illustrated, for rotating the spindle 833 about its own central axis.

The grippers 835 are circumferentially spaced from each other on an outer edge portion of an end face of the support base 834 that faces the blade holders 74 of the corresponding blade stocker 70. According to the first embodiment, there are four grippers 835 disposed at circumferentially equally spaced intervals on the outer edge portion of the end face of the support base 834. The grippers 835 are movable radially on the end face of the support base 834 by a drive mechanism, not illustrated, housed in the support base 834. When the grippers 835 are moved radially inwardly toward each other, they grip the outer circumferential surface of a fastening nut 27. When the grippers 835 are moved radially outwardly away from each other, they release the fastening nut 27. The grippers 835 are made of an electrically conductive material, e.g., metal in the first embodiment. The grippers 835 act as electrically conductive holders for holding a fastening nut 27.

The moving unit 84 moves the unit body 81, i.e., the blade chucks 82 and the nut holder 83, along the X-axis direction, the Y-axis direction, and the Z-axis direction. The moving unit 84 moves each of the blade chucks 82 between a position where a cutting blade 21 can be mounted on and dismounted from the blade holder 74 in the transfer position 744 of the corresponding blade stocker 70 and a position where a cutting blade 21 can be mounted on and dismounted from the boss 242 of the mount 24 of the cutting unit 20 in the mounting/dismounting position. The moving unit 84 moves the nut holder 83 to a position where a fastening nut 27 can be mounted on and dismounted from the boss 242 of the mount 24 of the cutting unit 20 in the mounting/dismounting position. The moving unit 84 includes at least one ball screw, an electric motor, and guide rails.

The blade changer unit 7 further includes a changer-unit-side position detecting unit, not illustrated, for detecting the positions in the X-axis direction and the positions in the Z-axis direction of the central axes of at least the blade chucks 82 and the nut holder 83, and the positions in the Y-axis direction of flat surfaces 827 of the grippers 825 of the blade chucks 82 for contacting an end face of the circular base 212 of a cutting blade 21 and the positions in the Y-axis direction of the grippers 835 of the nut holder 83.

(Conductive Position Detecting Unit)

Figure 9:
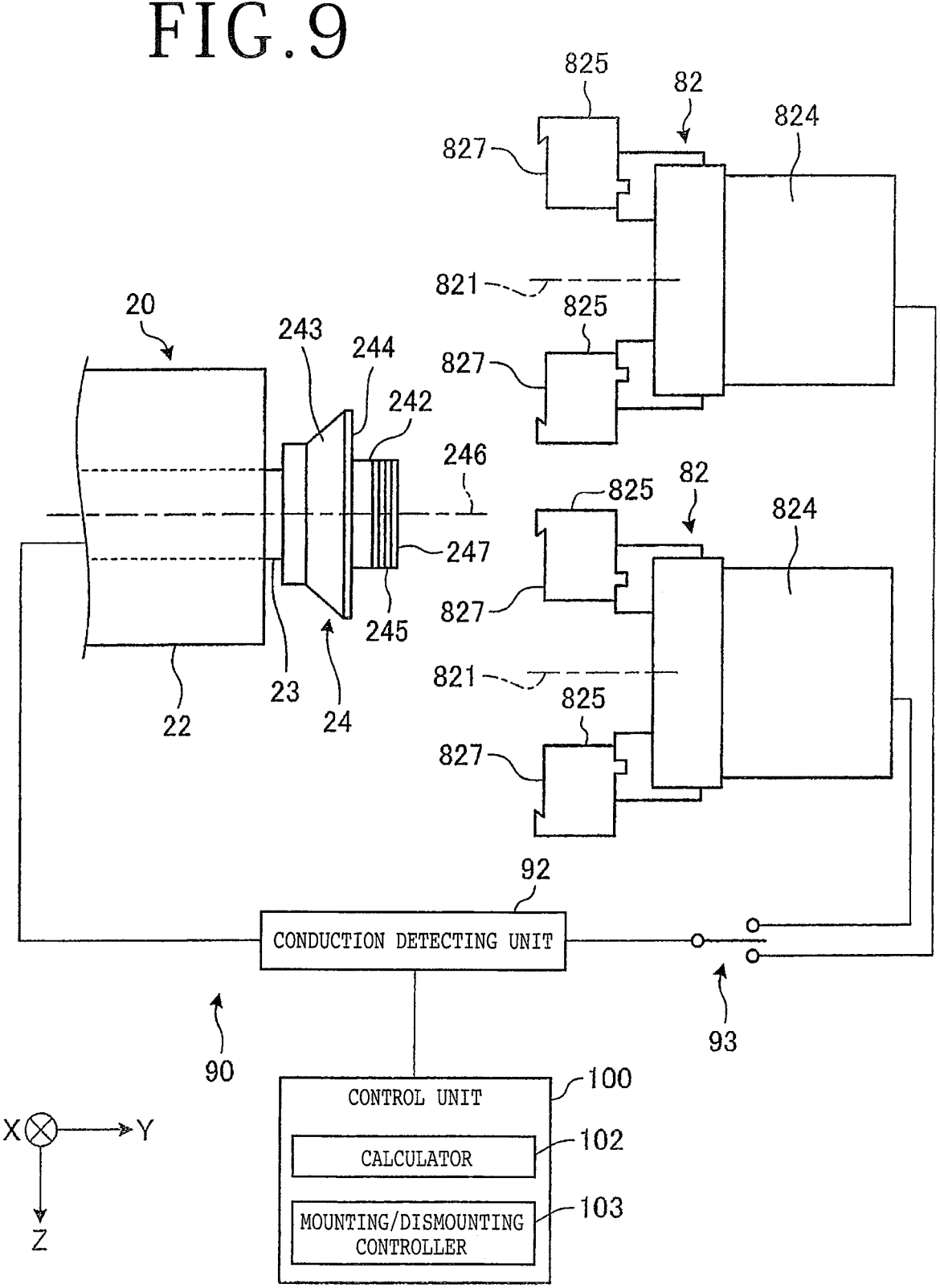
FIG. 9 is a side elevational view illustrating by way of example the structure of a conductive position detecting unit of the blade mounting/dismounting unit illustrated in FIG. 6.

Each of the blade mounting/dismounting units 80 of the blade changer unit 7 includes a conductive position detecting unit 90, illustrated in FIG. 9, for detecting the position in the X-axis direction and the position in the Z-axis direction of the central axis 246 of the boss 242 of each cutting unit 20 positioned in the mounting/dismounting position and also detecting the position in the Y-axis direction of a distal end face 247 of the boss 242. FIG. 9 illustrates by way of example the structure of the conductive position detecting unit 90 of the blade mounting/dismounting unit 80 illustrated in FIG. 6.

As illustrated in FIG. 9, the conductive position detecting unit 90 includes a power supply, not illustrated, a conduction detecting unit 92, and a selector switch 93. The power supply supplies direct current (DC) electric power to the mount 24 and the grippers 825 of either one of the two blade chucks 82 through the spindle 23 of the corresponding cutting unit 20. The selector switch 93 selects either one of the two blade chucks 82 to choose the grippers 825 to which the power supply is to supply the DC electric power. The conduction detecting unit 92 detects an electric current that flows when the blade chuck 82 to which the power supply supplies the DC electric power and the mount 24 of the spindle 23 contact each other, and outputs a signal indicating the detection of the electric current to the control unit 100.

When the conduction detecting unit 92 detects an electric current that flows when the blade chuck 82 to which the power supply supplies the DC electric power and the mount 24 of the spindle 23 contact each other, the conductive position detecting unit 90 can detect the position in the X-axis direction and the position in the Z-axis direction of the central axis 246 of the mount 24 of the cutting unit 20 in the mounting/dismounting position and also detect the position in the Y-axis direction of the distal end face 247 of the boss 242 of the mount 24.

According to the first embodiment, the conductive position detecting unit 90 includes the selector switch 93 and can detect the positions, referred to above, of the mount 24 by bringing the grippers 825 of a selected one of the two blade chucks 82 into contact with the mount 24. According to the present invention, however, the conductive position detecting unit 90 may be free of the selector switch 93 and can detect the positions, referred to above, of the mount 24 by bringing the grippers 825 of one of the blade chucks 82 to which the power supply supplies DC electric power into contact with the mount 24. According to the present invention, furthermore, the conductive position detecting unit 90 can detect the positions, referred to above, of the mount 24 by bringing the grippers 835 of the nut holder 83 to which a power supply, not illustrated, supplies electric power into contact with the mount 24.

The control unit 100 controls the various units of the blade changer unit 7 to enable the blade changer unit 7 to mount cutting blades 21 on and dismount cutting blades 21 from the cutting units 20. The control unit 100 also detects electric conduction between the grippers 825 and 835 and the bosses 242 on the basis of detection signals from the conduction detecting unit 92 of the conductive position detecting unit 90 of the blade changer unit 7. The control unit 100 further controls the various units of the cutting apparatus 1 to enable the cutting apparatus 1 to process the workpiece 200. The control unit 100 is a computer having an arithmetic processing apparatus having a microprocessor such as a central processing unit (CPU), a storage apparatus having a memory such as a read only memory (ROM) or a random access memory (RAM), and an input/output interface apparatus. The arithmetic processing apparatus of the control unit 100 performs arithmetic processing operations according to computer programs stored in the storage apparatus and outputs control signals for controlling the cutting apparatus 1 and the blade changer unit 7 through the input/output interface apparatus to the units, referred to above, of the cutting apparatus 1 and the blade changer unit 7.

The control unit 100 is connected to a display unit 101, illustrated in FIG. 1, including a liquid crystal display apparatus for displaying workpiece processing states and images, and an input unit that is used by the operator to enter processing contents information. The input unit includes at least one of a touch panel on the display unit 101 and an external input apparatus such as a keyboard or the like.

As illustrated in FIG. 1, for example, the control unit 100 includes a calculator 102 and a mounting/dismounting controller 103. The calculator 102 calculates the position in the X-axis direction and the position in the Z-axis direction of the central axis 246 of the mount 24 from detection signals from the position detecting units at the time the conduction detecting unit 92 detects electric conduction when the moving unit 84 is controlled to bring the grippers 825 of a blade chuck 82 into contact with the mount 24 at at least three contact points. The calculator 102 also calculates the position in the Y-axis direction of the distal end face 247 of the boss 242 of the mount 24 from detection signals from the position detecting units at the time the conduction detecting unit 92 detects electric conduction when the moving unit 84 is controlled to bring the grippers 825 of a blade chuck 82 into contact with the distal end face 247 at at least one contact point.

The mounting/dismounting controller 103 mounts a cutting blade 21 on or dismounts a cutting blade 21 from the boss 242 of a cutting unit 20 in the position where the central axis 246 of the mount 24 calculated by the calculator 102 and the central axis 821 of the blade chuck 82. The mounting/dismounting controller 103 also mounts a cutting blade 21 on or dismounts a cutting blade 21 from the boss 242 of a cutting unit 20 in the position in the Y-axis direction of the distal end face 247 of the boss 242 calculated by the calculator 102.

The functions of the calculator 102 and the mounting/dismounting controller 103 are realized when the arithmetic processing apparatus performs arithmetic processing operations according to computer programs stored in the storage apparatus of the control unit 100. The storage apparatus of the control unit 100 stores the position in the X-axis direction and the position in the Z-axis direction of the central axis 743 of the blade holder 74 in the transfer position 744 of each blade stocker 70, and also stores the position in the Y-axis direction of the blade fitting member 741 of the blade holder 74 in the transfer position 744 of each blade stocker 70. The storage apparatus of the control unit 100 further stores the position in the X-axis direction and the position in the Z-axis direction of the central axis 246 of the boss 242 of the mount 24 of each cutting unit 20 positioned in the mounting/dismounting position, and also stores the position in the Y-axis direction of the distal end face 247 of the boss 242 of the mount 24 of each cutting unit 20 positioned in the mounting/dismounting position.

(Processing Operation of the Cutting Apparatus)

Processing operation of the cutting apparatus 1 of the above structure will be described below. In the processing operation, the operator registers processing contents information in the control unit 100, takes workpieces 200 to be cut into the cassette 61, and places the cassette 61 on an upper surface of the cassette elevator 60. In the processing operation, furthermore, the operator places cutting blades 21 on the blade holders 74 of each of the blade stockers 70 of the blade changer unit 7.

Thereafter, in response to an instruction from the operator to start the processing operation, the cutting apparatus 1 starts the processing operation. When the cutting apparatus 1 has started the processing operation, the control unit 100 controls the feed unit to deliver a workpiece 200 from within the cassette 61 to the chuck table 10 in the loading/unloading area 64, where the reverse side 204 of the workpiece 200 supported on the annular frame 205 by the adhesive tape 206 is held under suction on the holding surface 11 of the chuck table 10, and controls the clamps 12 to clamp the annular frame 205.

The control unit 100 controls the X-axis moving unit to move the chuck table 10 toward the processing area 63, controls the image capturing unit 30 to capture an image of the workpiece 200, and carries out an alignment process for positioning the workpiece 200 and the cutting units 20 in alignment with each other on the basis of the image captured by the image capturing unit 30. Then, the control unit 100 moves the workpiece 200 and the cutting units 20 relatively to each other along the projected dicing lines 202, and causes the cutting blades 21 to cut into the workpiece 200 along the projected dicing lines 202 into individual device chips that carry the respective devices 203. Thereafter, the control unit 100 controls the cleaning unit 62 to clean the workpiece 200 as divided into the device chips 203 and then controls the feed unit to take the workpiece 200 back into the cassette 61. Subsequently, the control unit 100 controls the cutting units 20 to successively cut the workpieces 200 taken out of the cassette 61, and finishes the processing operation when all the workpieces 200 from the cassette 61 have been cut.

(Cutting Blade Mounting/Dismounting Operation)

Next, an operation of the blade changer unit 7 of the cutting apparatus 1 of the above structure for mounting/dismounting a cutting blade 21 will be described below.

According to the first embodiment, the control unit 100 operates to mount and dismount a cutting blade 21 if it decides that the cutting blade 21 of at least one of the cutting units 20 has reached a blade changing timing while the cutting apparatus 1 is in processing operation. The blade changing timing refers to a timing to change the cutting blade 21 of each of the cutting units 20. The blade changing timing is reached each time the cutting blade 21 has cut a preset number of workpieces 200 or when the measured outside diameter of the cutting blade 21 becomes smaller than a preset numerical value, for example, and is registered as part of the processing contents information in the control unit 100. Furthermore, the blade changing timing according to the present invention may be sometime while a workpiece 200 is being processed or may be when a workpiece 200 is changed while a plurality of workpieces 200 are being processed in succession.

The operation of the blade changer unit 7 of the cutting apparatus 1 for mounting and dismounting the cutting blade 21 refers to a process of removing the cutting blade 21 of a cutting unit 20 and attaching a cutting blade 21 held by a blade stocker 70 to the cutting unit 20. In other words, the operation for mounting and dismounting the cutting blade 21 refers to a process of replacing the cutting blade 21 mounted on a cutting unit 20 with a cutting blade 21 held by a blade stocker 70.

In the operation for mounting and dismounting the cutting blade 21, the mounting/dismounting controller 103 of the control unit 100 stops rotating the spindle 23 of a cutting unit 20 that has reached a blade changing timing, and controls the Y-axis moving unit 40 and the corresponding Z-axis moving unit 50 to position the cutting unit 20 that has reached the blade changing timing in the mounting/dismounting position. In the operation for mounting and dismounting a cutting blade 21, furthermore, the mounting/dismounting controller 103 controls the electric motor 75 of the blade stocker 70 corresponding to the cutting unit 20 that has reached the blade changing timing to position a cutting blade 21 to be mounted on the cutting unit 20 that has reached the blade changing timing in the transfer position 744.

In the operation for mounting and dismounting the cutting blade 21, the mounting/dismounting controller 103 controls operation of the moving unit 84 of the corresponding blade mounting/dismounting unit 80 on the basis of the position in the X-axis direction and the position in the Z-axis direction of the central axis 246 of the mount 24 of the cutting unit 20 in the mounting/dismounting position, the position in the Y-axis direction of the distal end face 247 of the mount 24 of the cutting unit 20 in the mounting/dismounting position, the positions being stored in the storage apparatus, and the detection signals from the position detecting units.

In the operation for mounting and dismounting the cutting blade 21, the mounting/dismounting controller 103 controls the moving unit 84 to position one of the blade chucks 82 in a position where the grippers 825 of the blade chuck 82 can grip the cutting blade 21 held on the blade holder 74 in the transfer position 744 on the blade stocker 70. The mounting/dismounting controller 103 controls the blade chuck 82 to cause the grippers 825 thereof to grip the cutting blade 21 held on the blade holder 74 in the transfer position 744 on the blade stocker 70.

The mounting/dismounting controller 103 controls the moving unit 84 to move the blade mounting/dismounting unit 80 toward the cutting unit 20 in the mounting/dismounting position and position the nut holder 83 in a position where the grippers 835 thereof can grip the fastening nut 27 of the cutting unit 20 in the mounting/dismounting position.

The mounting/dismounting controller 103 controls the nut holder 83 to cause the grippers 835 thereof to grip the fastening nut 27 and rotate the spindle 833 thereof about the central axis 831 in a direction to remove the fastening nut 27 from the externally threaded outer circumferential surface 245 of the boss 242. The mounting/dismounting controller 103 controls the nut holder 83 to rotate the spindle 833 until the fastening nut 27 disengages from the externally threaded outer circumferential surface 245, whereupon the mounting/dismounting controller 103 stops rotating the spindle 833. The mounting/dismounting controller 103 controls the moving unit 84 to move the other blade chuck 82 toward the cutting unit 20 in the mounting/dismounting position and position the other blade chuck 82 in a position where the grippers 825 thereof can grip the cutting blade 21 mounted on the cutting unit 20 from which the fastening nut 27 has been removed.

The mounting/dismounting controller 103 controls the other blade chuck 82 to cause the grippers 825 thereof to grip the cutting blade 21 of the cutting unit 20 from which the fastening nut 27 has been removed. The mounting/dismounting controller 103 controls the moving unit 84 to move the cutting blade 21 gripped by the other blade chuck 82 away along the Y-axis direction from the mount 24 of the cutting unit 20 from which the fastening nut 27 has been removed, pulling the boss 242 of the mount 24 of the cutting unit 20 from which the fastening nut 27 has been removed from within the insertion hole 211 in the cutting blade 21 gripped by the other blade chuck 82.

The mounting/dismounting controller 103 controls the moving unit 84 to move the one blade chuck 82 toward the cutting unit 20 from which the fastening nut 27 and the cutting blade 21 have been removed, and position the one blade chuck 82 in a position where the gripped cutting blade 21 is juxtaposed with and spaced in the Y-axis direction from the mount 24 of the cutting unit 20 from which the fastening nut 27 and the cutting blade 21 have been removed. At this time, the mounting/dismounting controller 103 positions the one blade chuck 82 in a position where the central axis 821 thereof is coaxial with, i.e., is in line with, the central axis 246 of the mount 24 of the cutting unit 20 from which the fastening nut 27 and the cutting blade 21 have been removed.

The mounting/dismounting controller 103 controls the moving unit 84 to move the one blade chuck 82 along the Y-axis direction toward the cutting unit 20 from which the fastening nut 27 and the cutting blade 21 have been removed, and insert the boss 242 of the mount 24 of the cutting unit 20 from which the fastening nut 27 and the cutting blade 21 have been removed into the insertion hole 211 in the cutting blade 21 gripped by the one blade chuck 82. The mounting/dismounting controller 103 controls the moving unit 84 to position the one blade chuck 82 in a position where the circular base 212 of the cutting blade 21 gripped by the one blade chuck 82 contacts the outer edge portion 244 of the bearing flange 243 of the mount 24, and releases the grippers 825 of the one blade chuck 82 from the cutting blade 21.

The mounting/dismounting controller 103 controls the moving unit 84 to move the one blade chuck 82 away from the boss 242 of the mount 24 of the cutting unit 20 on which the cutting blade 21 has been mounted, and position the nut holder 83 in a position where the fastening nut 27 gripped by the nut holder 83 can be threaded over the externally threaded outer circumferential surface 245 of the boss 242 of the mount 24 of the cutting unit 20 on which the cutting blade 21 has been mounted. The mounting/dismounting controller 103 controls the nut holder 83 to rotate the spindle 833 thereof about the central axis 831 in a direction to put the fastening nut 27 onto the externally threaded outer circumferential surface 245 while gripping the fastening nut 27 with the grippers 835. The mounting/dismounting controller 103 controls the nut holder 83 to rotate the spindle 833 thereof until the fastening nut 27 is threaded over the externally threaded outer circumferential surface 245, and thereafter stop rotating the spindle 833, and releases the grippers 835 of the nut holder 83 from the fastening nut 27.

The mounting/dismounting controller 103 controls the moving unit 84 to move the blade mounting/dismounting unit 80 toward the blade stocker 70, and position the other blade chuck 82 in a position where the gripped cutting blade 21 is juxtaposed with and spaced in the Y-axis direction from the blade holder 74 in the transfer position 744. At this time, the mounting/dismounting controller 103 positions the other blade chuck 82 in a position where the central axis 821 thereof is coaxial with, i.e., is in line with, the central axis 745 of the blade fitting member 741 of the blade holder 74 in the transfer position 744.

The mounting/dismounting controller 103 controls the moving unit 84 to bring the other blade chuck 82 along the Y-axis direction closely to the blade holder 74 in the transfer position 744, and insert the blade fitting member 741 into the insertion hole 211 in the cutting blade 21 gripped by the other blade chuck 82. The mounting/dismounting controller 103 controls the moving unit 84 to position the other blade chuck 82 in a position where the circular base 212 of the cutting blade 21 gripped by the other blade chuck 82 contacts the blade holder 74 in the transfer position 744, and releases the grippers 825 of the other blade chuck 82 from the cutting blade 21.

The mounting/dismounting controller 103 controls the moving unit 84 to move the blade mounting/dismounting unit 80 to a standby position, and thereafter finishes the operation to mount 24 and dismount the cutting blade 21. As described above, the mounting/dismounting controller 103 of the control unit 100 aligns the central axis 246 of the boss 242 of the mount with the central axes 821 of the blade chucks 82 and mounts a cutting blade 21 on and dismounts a cutting blade 21 from the mount 24.

(Mount Position Calculating Operation)

Next, an operation of the blade changer unit 7 of the cutting apparatus 1 of the above structure for calculating the position of the boss 242 of the mount 24 will be described below. According to the first embodiment, the control unit 100 carries out the operation for calculating the position of the mount 24 if it decides that a position calculating timing to calculate the position of the boss 242 of the mount 24 of at least one of the cutting units 20 has been reached. The position calculating timing refers to a timing to calculate the position in the X-axis direction and the position in the Z-axis direction of the central axis 246 of the boss 242 of the mount 24 of each cutting unit 20 in the mounting/dismounting position and also calculate the position in the Y-axis direction of the distal end face 247 of the boss 242. The position calculating timing is reached each time the cutting blade 21 has cut a preset number of workpieces 200, desirably immediately before each cutting blade 21 is to be changed, and is registered as part of the processing contents information in the control unit 100. According to the present invention, furthermore, the position calculating timing may be carried out anytime by the operator controlling the input unit.

Figure 10:
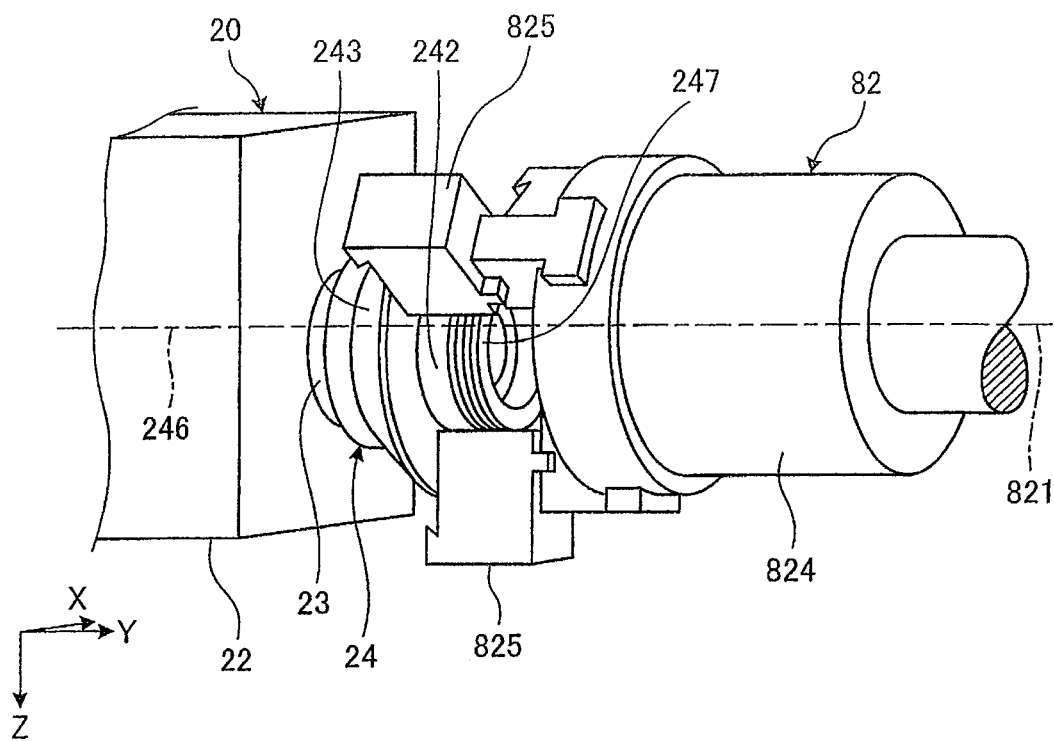
FIG. 10 is a perspective view illustrating the manner in which grippers of the blade chuck and an outer circumferential surface of a boss are held in contact with each other in a position calculating operation for calculating the position of the central axis of a mount of the blade changer unit illustrated in FIG. 3.
Figure 11:
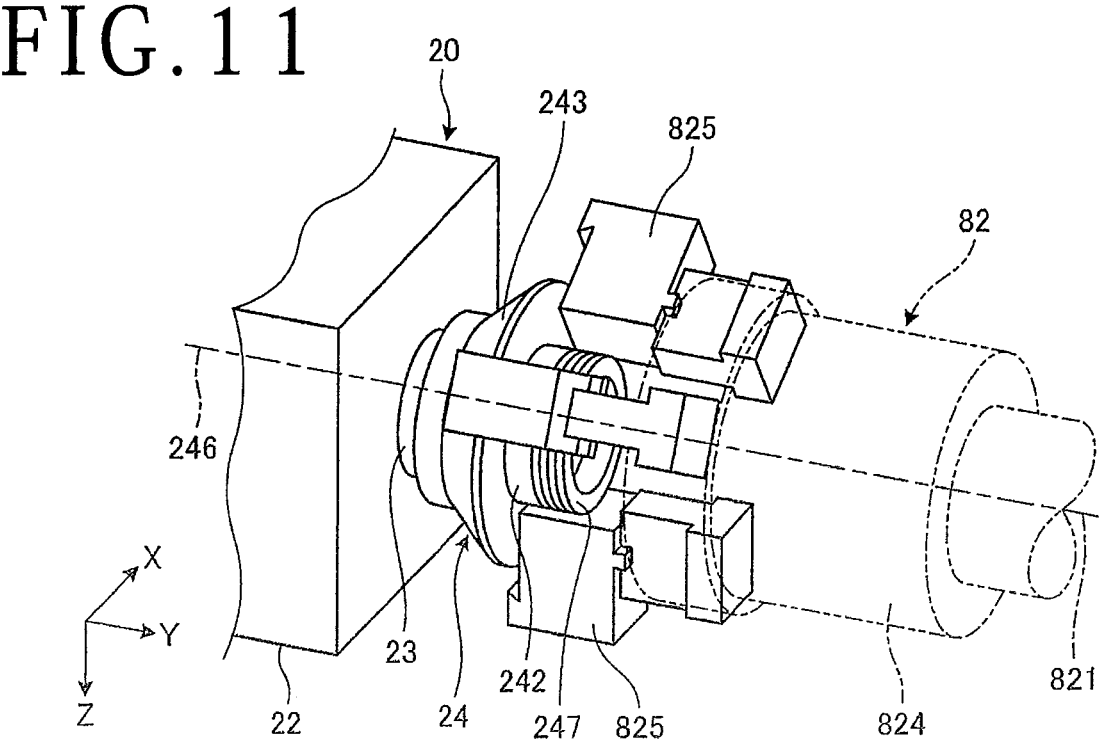
FIG. 11 is another perspective view illustrating the manner in which the grippers of the blade chuck and the outer circumferential surface of the boss are held in contact with each other in the position calculating operation for calculating the position of the central axis of the mount of the blade changer unit illustrated in FIG. 3.
Figure 12:
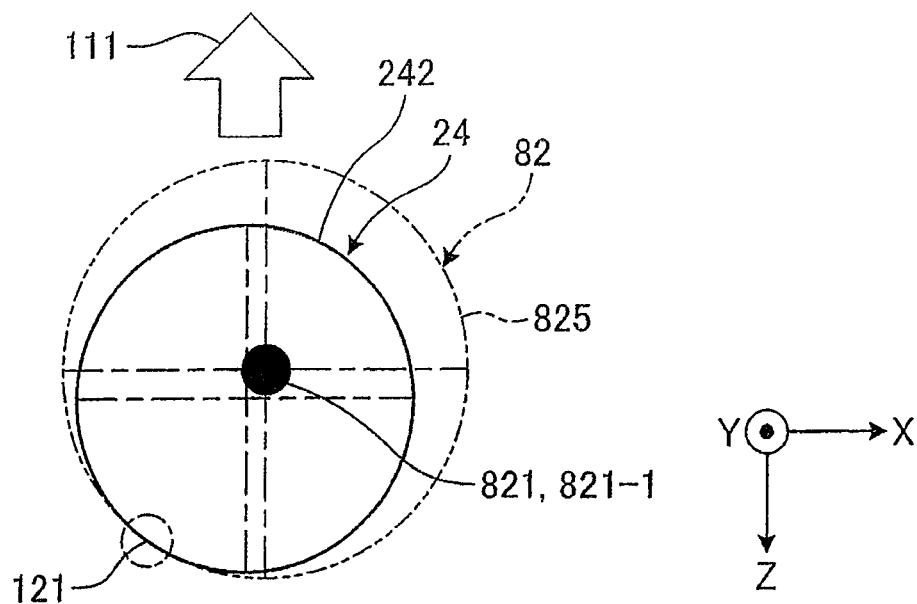
FIG. 12 is a view schematically illustrating the manner in which the grippers of the blade chuck and the outer circumferential surface of the boss are held in contact with each other at a first contact point in the position calculating operation for calculating the position of the central axis of the mount of the blade changer unit illustrated in FIG. 3.
Figure 13:
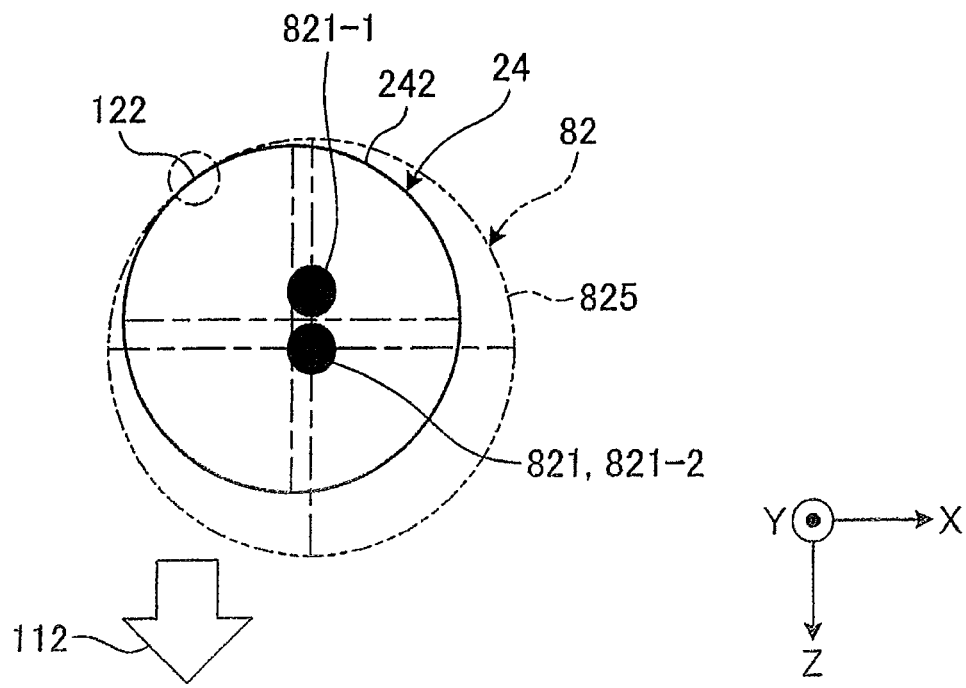
FIG. 13 is a view schematically illustrating the manner in which the grippers of the blade chuck and the outer circumferential surface of the boss are held in contact with each other at a second contact point in the position calculating operation for calculating the position of the central axis of the mount of the blade changer unit illustrated in FIG. 3.
Figure 14:
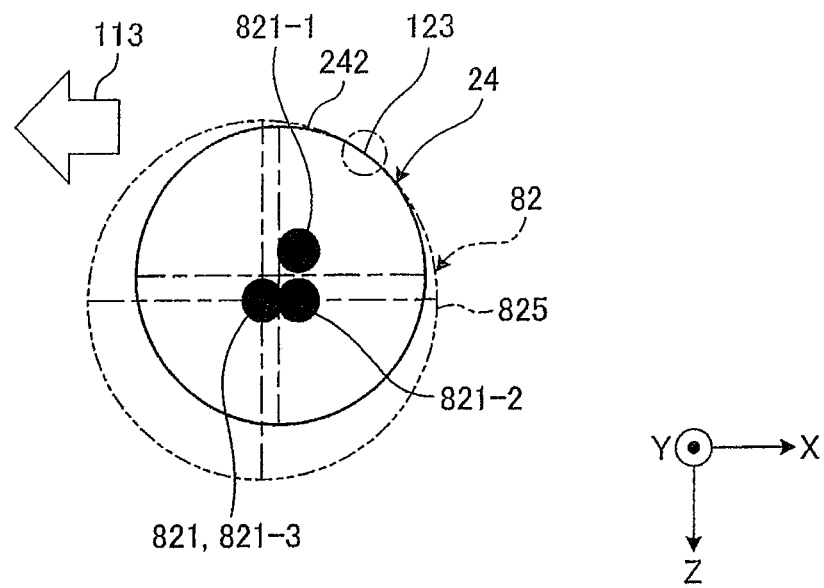
FIG. 14 is a view schematically illustrating the manner in which the grippers of the blade chuck and the outer circumferential surface of the boss are held in contact with each other at a third contact point in the position calculating operation for calculating the position of the central axis of the mount of the blade changer unit illustrated in FIG. 3.

In the mount position calculating operation, first, the calculator 102 of the control unit 100 performs an operation for calculating the position of the central axis 246 of the mount 24 of the cutting unit 20 in the mounting/dismounting position. FIG. 10 illustrates in perspective the manner in which the grippers of the blade chuck and the outer circumferential surface of the boss are held in contact with each other in a position calculating operation for calculating the position of the central axis of the mount of the blade changer unit illustrated in FIG. 3. FIG. 11 illustrates in perspective the manner in which the grippers of the blade chuck and the outer circumferential surface of the boss are held in contact with each other in the position calculating operation for calculating the position of the central axis of the mount of the blade changer unit illustrated in FIG. 3. FIG. 12 schematically illustrates the manner in which the grippers of the blade chuck and the outer circumferential surface of the boss are held in contact with each other at a first contact point in the position calculating operation for calculating the position of the central axis of the mount of the blade changer unit illustrated in FIG. 3. FIG. 13 schematically illustrates the manner in which the grippers of the blade chuck and the outer circumferential surface of the boss are held in contact with each other at a second contact point in the position calculating operation for calculating the position of the central axis of the mount of the blade changer unit illustrated in FIG. 3. FIG. 14 schematically illustrates the manner in which the grippers of the blade chuck and the outer circumferential surface of the boss are held in contact with each other at a third contact point in the position calculating operation for calculating the position of the central axis of the mount of the blade changer unit illustrated in FIG. 3.

In the position calculating operation for calculating the position of the central axis 246 of the mount 24, the calculator 102 of the control unit 100 stops rotating the spindle 23 of the cutting unit 20 that has reached the position calculating timing, and controls the Y-axis moving unit 40 and the corresponding Z-axis moving unit 50 to position the cutting unit 20 that has reached the position calculating timing in the mounting/dismounting position. In the position calculating operation for calculating the position of the central axis 246 of the mount 24, as in the operation for mounting and dismounting a cutting blade 21, the calculator 102 of the control unit 100 removes the fastening nut 27 and the cutting blade 21 from the cutting unit 20 that has reached the position calculating timing, brings the grippers 825 of the blade chuck 82 to which electric power is supplied from the power supply into contact with the boss 242 of the mount 24 of the cutting unit 20 in the mounting/dismounting position, as illustrated in FIGS. 10 and 11, and calculates the position in the X-axis direction and the position in the Z-axis direction of the central axis 246 of the boss 242 of the mount 24 of the cutting unit 20 in the mounting/dismounting position.

In the position calculating operation for calculating the position of the mount 24, the calculator 102 controls operation of the moving unit 84 of the corresponding blade mounting/dismounting unit 80 on the basis of the position in the X-axis direction and the position in the Z-axis direction of the central axis 246 of the mount 24 of the cutting unit 20 in the mounting/dismounting position, the position in the Y-axis direction of the distal end face 247 of the mount 24 of the cutting unit 20 in the mounting/dismounting position, the positions being stored in the storage apparatus, and the detection signals from the position detecting units.

For calculating the position in the X-axis direction and the position in the Z-axis direction of the central axis 246 of the boss 242 of the mount 24 of cutting unit 20 in the mounting/dismounting position, the calculator 102 controls the moving unit 84 to move the blade mounting/dismounting unit 80 to keep the grippers 825 of one of the blade chucks 82 that has not gripped a cutting blade 21 away from each other, and position the grippers 825 closely to the outer circumferential surface of the boss 242 of the mount 24 of the cutting unit 20 from which the fastening nut 27 and the cutting blade 21 have been removed, so that the outer circumferential surface of the boss 242 and the blade chuck 82 can be brought into contact with each other through fine adjustments. While supplying electric power from the power supply to the grippers 825 of the one of the blade chucks 82, the calculator 102 controls the moving unit 84 to move one of the blade chucks 82 in a first direction 111 (see FIG. 12) perpendicular to the central axis 821. According to the first embodiment, the first direction 111 is illustrated as an upward direction along the Z-axis direction. However, the present invention is not limited to such a direction.

Then, as illustrated in FIG. 12, the grippers 825 contact the outer circumferential surface of the boss 242 at a first contact point 121. The calculator 102 recognizes that the grippers 825 have contacted the outer circumferential surface of the boss 242 at the first contact point 121 on the basis of the detection signals from the conduction detecting unit 92, and stops moving the blade mounting/dismounting unit 80 of the moving unit 84. The calculator 102 calculates the position in the X-axis direction and the position in the Z-axis direction of the central axis 821 (hereinafter denoted by 821-1) at the time the grippers 825 have contacted the outer circumferential surface of the boss 242 at the first contact point 121 on the basis of the detection signals from the position detecting units, and temporarily stores the calculated positions in the storage apparatus. In FIGS. 12, 13, and 14, the outer circumferential surface of the boss 242 is schematically indicated by a solid-line circle, whereas a circle inscribed in the grippers 825 is schematically indicated by a two-dot-dash-line circle.

While supplying electric power from the power supply to the grippers 825 of one of the blade chucks 82, the calculator 102 controls the moving unit 84 to move one of the blade chucks 82 in a second direction 112 (see FIG. 13) perpendicular to the central axis 821 and different from the first direction 111. According to the first embodiment, the second direction 112 is illustrated as a downward direction along the Z-axis direction. However, the present invention is not limited to such a direction.

Then, as illustrated in FIG. 13, the grippers 825 contact the outer circumferential surface of the boss 242 at a second contact point 122 different from the first contact point 121. The calculator 102 recognizes that the grippers 825 have contacted the outer circumferential surface of the boss 242 at the second contact point 122 on the basis of the detection signals from the conduction detecting unit 92, and stops moving the blade mounting/dismounting unit 80 of the moving unit 84. The calculator 102 calculates the position in the X-axis direction and the position in the Z-axis direction of the central axis 821 (hereinafter denoted by 821-2) at the time the grippers 825 have contacted the outer circumferential surface of the boss 242 at the second contact point 122 on the basis of the detection signals from the position detecting units, and temporarily stores the calculated positions in the storage apparatus.

While supplying electric power from the power supply to the grippers 825 of one of the blade chucks 82, the calculator 102 controls the moving unit 84 to move one of the blade chucks 82 in a third direction 113 (see FIG. 14) perpendicular to the central axis 821 and different from the first direction 111 and the second direction 112. According to the first embodiment, the third direction 113 is illustrated as a direction parallel to the X-axis direction. However, the present invention is not limited to such a direction.

Then, as illustrated in FIG. 14, the grippers 825 contact the outer circumferential surface of the boss 242 at a third contact point 123. The calculator 102 recognizes that the grippers 825 have contacted the outer circumferential surface of the boss 242 at the third contact point 123 on the basis of the detection signals from the conduction detecting unit 92, and stops moving the blade mounting/dismounting unit 80 of the moving unit 84. The third contact point 123 are different from both the first contact point 121 and the second contact point 122. The calculator 102 calculates the position in the X-axis direction and the position in the Z-axis direction of the central axis 821 (hereinafter denoted by 821-3) at the time the grippers 825 have contacted the outer circumferential surface of the boss 242 at the third contact point 123 on the basis of the detection signals from the position detecting units, and temporarily stores the calculated positions in the storage apparatus.

On the basis of the positions in the X-axis direction and the positions in the Z-axis direction of the central axes 821-1, 821-2 and 821-3, the calculator 102 calculates the position in the X-axis direction and the position in the Z-axis direction of the center of a circle passing through the central axes 821-1, 821-2 and 821-3 as the position in the X-axis direction and the position in the Z-axis direction of the central axis 246 of the boss 242 of the mount 24 of the cutting unit 20, and stores the calculated positions as the position in the X-axis direction and the position in the Z-axis direction of the central axis 246 of the boss 242 of the mount 24 of a new cutting unit 20 in the storage apparatus.

In this manner, in the position calculating operation for calculating the central axis 246 of the mount 24, the calculator 102 calculates the position in the X-axis direction and the position in the Z-axis direction of the central axis 246 of the boss 242 of the mount 24 from the positions in the X-axis direction and the positions in the Z-axis direction of the central axes 821-1, 821-2 and 821-3 as represented by coordinates where the conduction detecting unit 92 has detected electric conduction at the time the grippers 825 contact the outer circumferential surface of the boss 242 of the mount 24 at the three contact points 121, 122 and 123 as illustrated in FIGS. 12, 13, and 14. According to the first embodiment, in the position calculating operation for calculating the central axis 246 of the mount 24, the calculator 102 brings the grippers 825 into contact with the outer circumferential surface of the boss 242 of the mount 24 at the three contact points 121, 122 and 123. According to the present invention, however, the grippers 825 may be brought into contact with the outer circumferential surface of the boss 242 of the mount 24 at at least the three contact points 121, 122 and 123.

Figure 15:
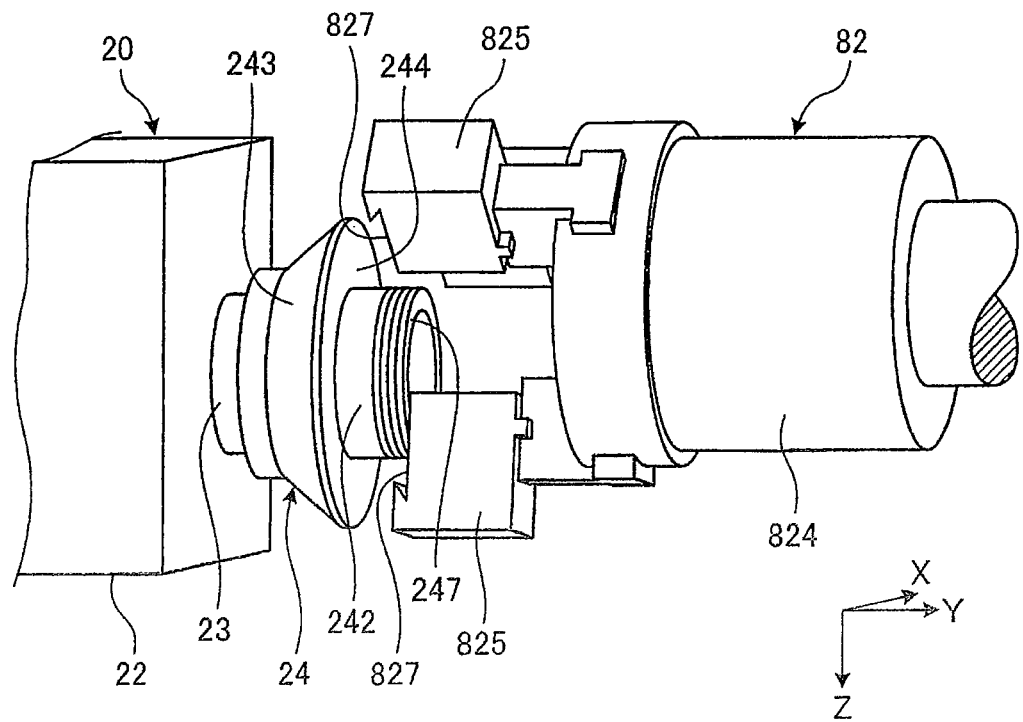
FIG. 15 is a perspective view illustrating the manner in which the grippers of the blade chuck and a distal end face of the boss are held in contact with each other in a position calculating operation for calculating the position of a distal end face of the mount of the blade changer unit illustrated in FIG. 3.
Figure 16:
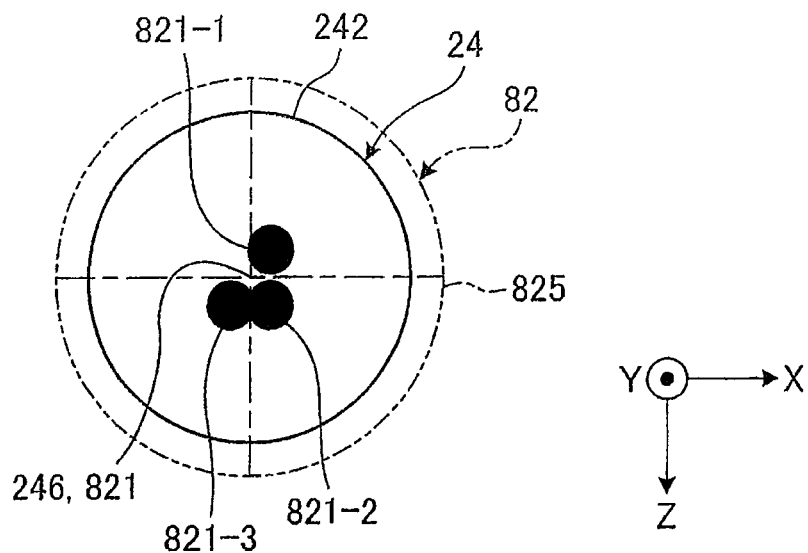
FIG. 16 is a view schematically illustrating the positional relationship between the grippers of the blade chuck and the boss in mounting or dismounting a blade on the basis of the position of the central axis of the mount that has been calculated by the position calculating operation for calculating the position of the mount of the blade changer unit illustrated in FIG. 3.

According to the first embodiment, in the position calculating operation for calculating the position of the mount, next, the calculator 102 of the control unit 100 carries out a position calculating operation for calculating the position of the distal end face 247 of the boss 242 of the mount 24 of the cutting unit 20 in the mounting/dismounting position. FIG. 15 illustrates in perspective the manner in which the grippers of the blade chuck and a distal end face of the boss are held in contact with each other in a position calculating operation for calculating the position of a distal end face of the mount of the blade changer unit illustrated in FIG. 3. FIG. 16 schematically illustrates the positional relationship between the grippers of the blade chuck and the boss in mounting or dismounting a blade on the basis of the position of the central axis of the mount that has been calculated by the position calculating operation for calculating the position of the mount of the blade changer unit illustrated in FIG. 3.

In the position calculating operation for calculating the position of the distal end face 247 of the boss 242 of the mount 24, the calculator 102 of the control unit 100 controls the moving unit 84 to move the blade mounting/dismounting unit 80 to position one of the blade chucks 82 in a position where the flat surfaces 827 of the grippers 825 are juxtaposed in the Y-axis direction with the distal end face 247 of the boss 242 of the mount 24 of the cutting unit 20 from which the fastening nut 27 and the cutting blade 21 have been removed. While the grippers 825 of one of the blade chucks 82 are being spaced from each other and supplying electric power thereto from the power supply, the calculator 102 controls the moving unit 84 to bring one of the blade chucks 82 along the Y-axis direction closely to the distal end face 247 of the boss 242 of the mount 24 of the cutting unit 20 from which the fastening nut 27 and the cutting blade 21 have been removed.

Then, as illustrated in FIG. 15, the flat surfaces 827 of the grippers 825 contact the distal end face 247 of the boss 242. The calculator 102 recognizes that the flat surfaces 827 of the grippers 825 has contacted the distal end face 247 of the boss 242 on the basis of the detection signals from the conduction detecting unit 92, and stops moving the blade mounting/dismounting unit 80 of the moving unit 84. The calculator 102 calculates the position in the Y-axis direction of the flat surfaces 827 at the time the flat surfaces 827 of the grippers 825 has contacted the distal end face 247 of the boss 242 on the basis of the detection signals from the position detecting units, and stores the calculated position as the position in the Y-axis direction of the distal end face 247 of the boss 242 of the mount 24 of a new cutting unit 20 in the storage apparatus.

In the position calculating operation for calculating the position of the distal end face 247 of the boss 242 of the mount 24, the calculator 102 thus calculates the position in the Y-axis direction of the distal end face 247 of the boss 242 of the mount 24 from the position in the Y-axis direction of the flat surfaces 827 as represented by coordinates where the conduction detecting unit 92 has detected electric conduction at the time the grippers 825 contact the distal end face 247 of the boss 242 of the mount 24 at one contact point. According to the first embodiment, in the position calculating operation for calculating the position of the distal end face 247 of the boss 242 of the mount 24, the calculator 102 brings the grippers 825 into contact with the distal end face 247 of the boss 242 of the mount 24 at one contact point. According to the present invention, the grippers 825 may be brought into contact with the distal end face 247 of the boss 242 of the mount 24 at at least one contact point. The mounting/dismounting controller 103 of the control unit 100 controls the blade mounting/dismounting unit 80 to align the central axis 821 of the blade chuck 82 with the central axis 246 of the mount 24, as illustrated in FIG. 16, on the basis of the calculated position in the X-axis direction and the calculated position in the Z-axis direction of the central axis 246 and the position in the Y-axis direction of the distal end face 247 of the boss 242, whereupon cutting blades 21 are dismounted and mounted. In FIG. 16, the outer circumferential surface of the boss 242 is schematically indicated by a solid-line circle, whereas a circle inscribed in the grippers 825 is schematically indicated by a two-dot-dash-line circle.

The blade changer unit 7 according to the first embodiment can easily grasp the positions where the grippers 825 and the mount 24 contact each other on the basis of the detection signals from the conduction detecting unit 92 that are produced when the mount 24 is supplied with electric power from the power supply through the grippers 825 of the blade chuck 82 and the spindle 23. As a result, the blade changer unit 7 according to the first embodiment is able to determine with ease the position of the mount 24 on which to mount a cutting blade 21.

Furthermore, the blade changer unit 7 according to the first embodiment can easily determine the position in the X-axis direction and the position in the Z-axis direction of the central axis 246 of the boss 242 of the mount 24 of the cutting unit 20 in the mounting/dismounting position as it brings the grippers 825 of the blade chuck 82 into contact with the outer circumferential surface of the boss 242 of the mount 24 of the cutting unit 20 in the mounting/dismounting position at at least the three contact points 121, 122 and 123.

Moreover, the blade changer unit 7 according to the first embodiment can easily determine the position in the Y-axis direction of the distal end face 247 of the boss 242 of the mount 24 of the cutting unit 20 in the mounting/dismounting position as it brings the grippers 825 of the blade chuck 82 into contact with the distal end face 247 of the boss 242 of the mount 24 of the cutting unit 20 in the mounting/dismounting position at at least one contact point.

[Modification]

Figure 17:
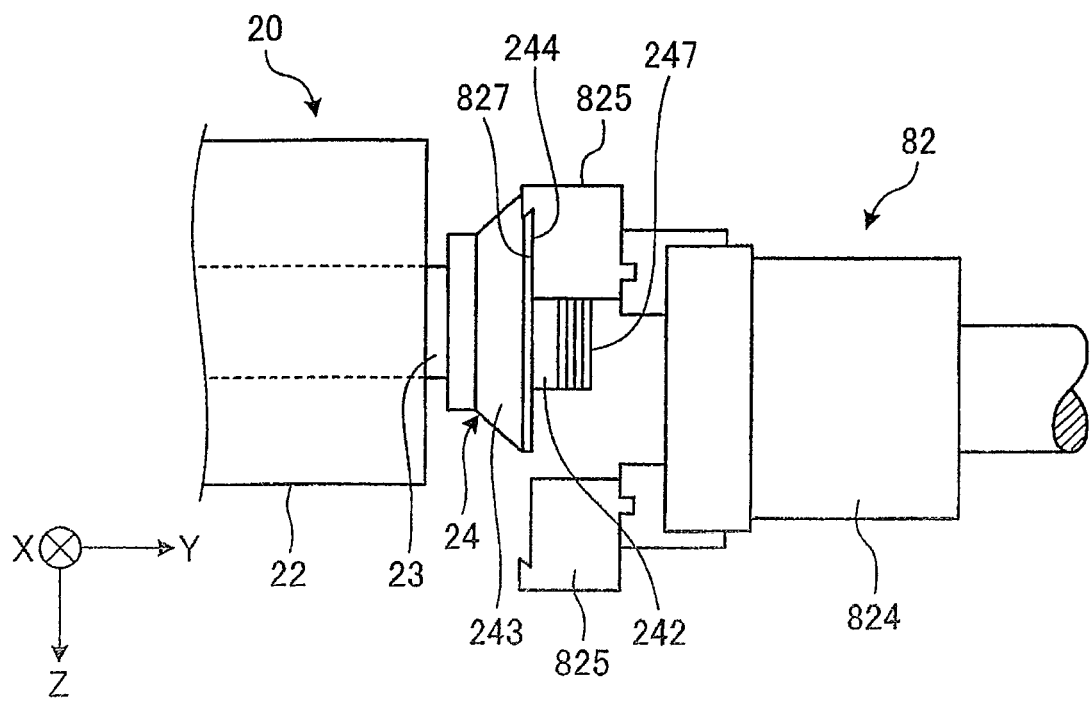
FIG. 17 is a side elevational view illustrating the manner in which grippers of a blade chuck and a bearing flange of a mount are held in contact with each other in a position calculating operation for calculating the position of a distal end face of the mount of a blade changer unit according to a modification of the first embodiment.

A blade changer unit according to a modification of the first embodiment will hereinafter be described below with reference to the drawings. FIG. 17 illustrates in side elevation the manner in which grippers of a blade chuck and a bearing flange of a mount are held in contact with each other in a position calculating operation for calculating the position of a distal end face of the mount of a blade changer unit according to the modification of the first embodiment. Those parts of the blade changer unit according to the modification which are identical to those of the blade changer unit according to the first embodiment are denoted by identical reference characters, and will not be described in detail below.

The blade changer unit, denoted by 7, according to the modification of the first embodiment is the same as the blade changer unit 7 according to the first embodiment except that a position calculating operation for calculating the position of the distal end face 247 of the boss 242 of the mount 24 in a position calculating operation for calculating the position of the mount 24 is different from the position calculating operation according to the first embodiment. In the position calculating operation for calculating the position of the distal end face 247 of the boss 242 of the mount 24 in the position calculating operation for calculating the position of the mount 24, the blade changer unit 7 according to the modification of the first embodiment brings the flat surfaces 827 of the grippers 825 of the blade chuck 82 into contact with the outer edge portion 244 of the distal end of the bearing flange 243 of the mount 24 of the cutting unit 20 in the mounting/dismounting position, calculates the position in the Y-axis direction of the outer edge portion 244 of the bearing flange 243, and calculates the position in the Y-axis direction of the distal end face 247 of the boss 242.

The blade changer unit 7 according to the modification of the first embodiment, as with the first embodiment, can easily grasp the positions where the grippers 825 and the mount 24 contact each other on the basis of the detection signals from the conduction detecting unit 92 that are produced when the mount 24 is supplied with electric power from the power supply through the grippers 825 of the blade chuck 82 and the spindle 23. As a result, the blade changer unit 7 according to the modification of the first embodiment, as with the first embodiment, is able to determine with ease the position of the mount 24 on which to mount a cutting blade 21. According to the present invention, the grippers 835 of the nut holder 83 may be brought into contact with the mount 24 in the same manner as with the first embodiment and the modification, and the position, referred to above, of the mount 24 may be calculated.

Second Embodiment

Figure 18:
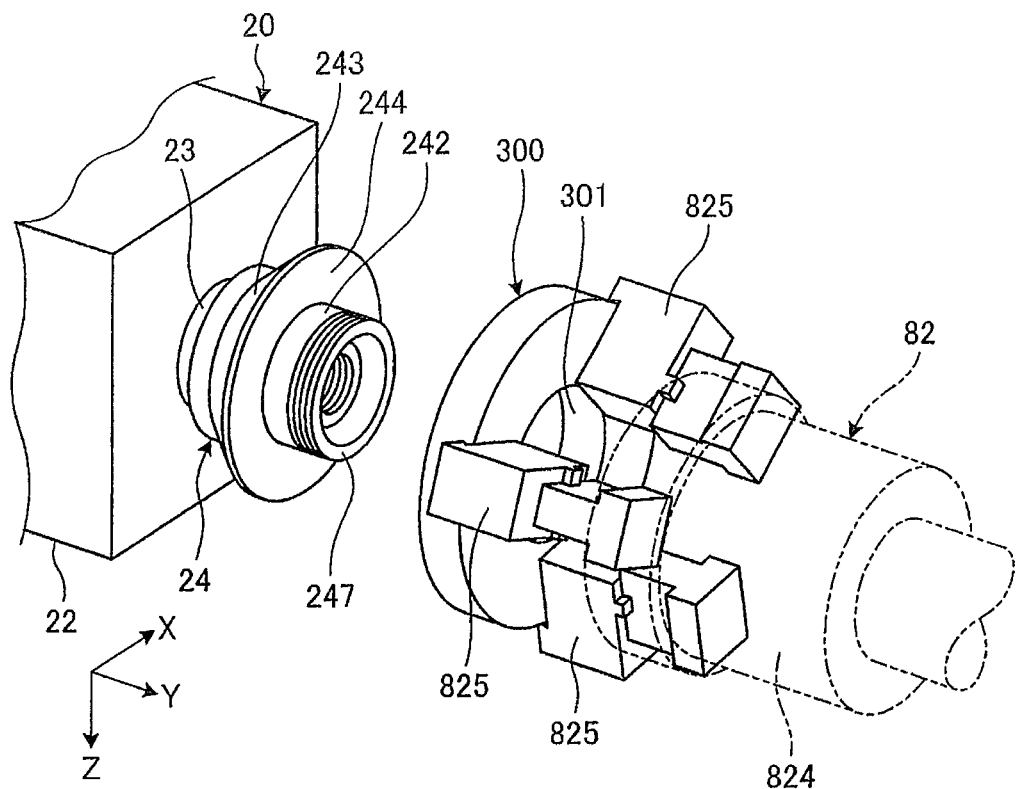
FIG. 18 is a perspective view illustrating the manner in which grippers of a blade chuck holds an electrically conductive jig in a position calculating operation for calculating the position of the central axis of a mount of a blade changer unit according to a second embodiment of the present invention.
Figure 19:
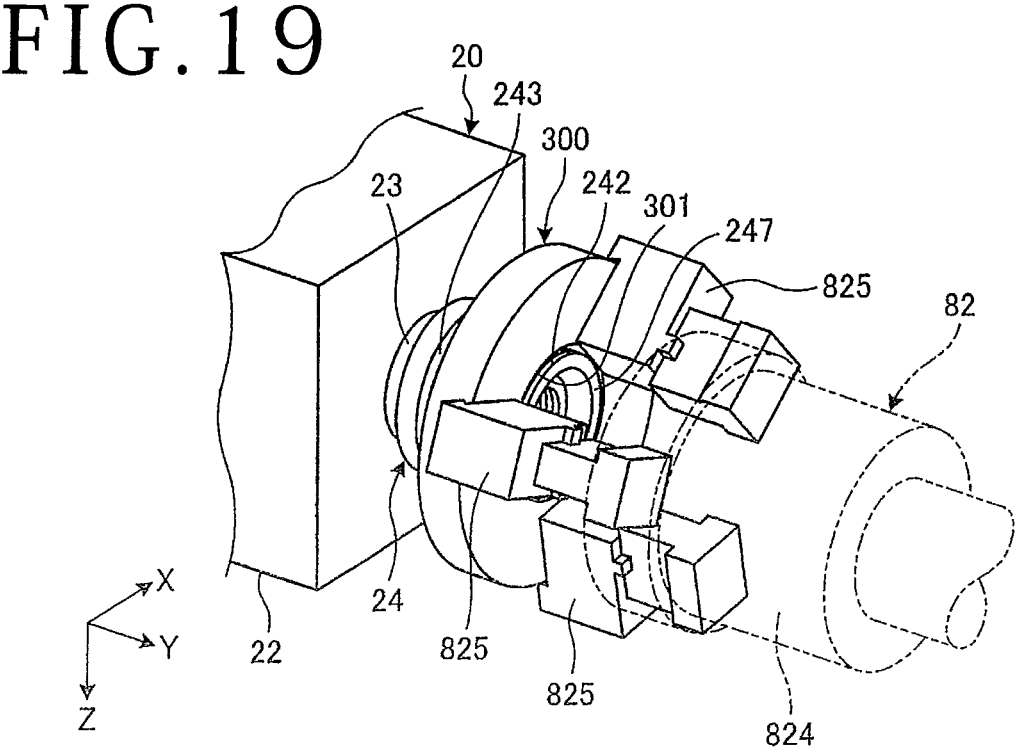
FIG. 19 is a perspective view illustrating the manner in which a boss is inserted into an opening in a jig in the position calculating operation for calculating the position of the central axis of the mount of the blade changer unit according to the second embodiment.
Figure 20:
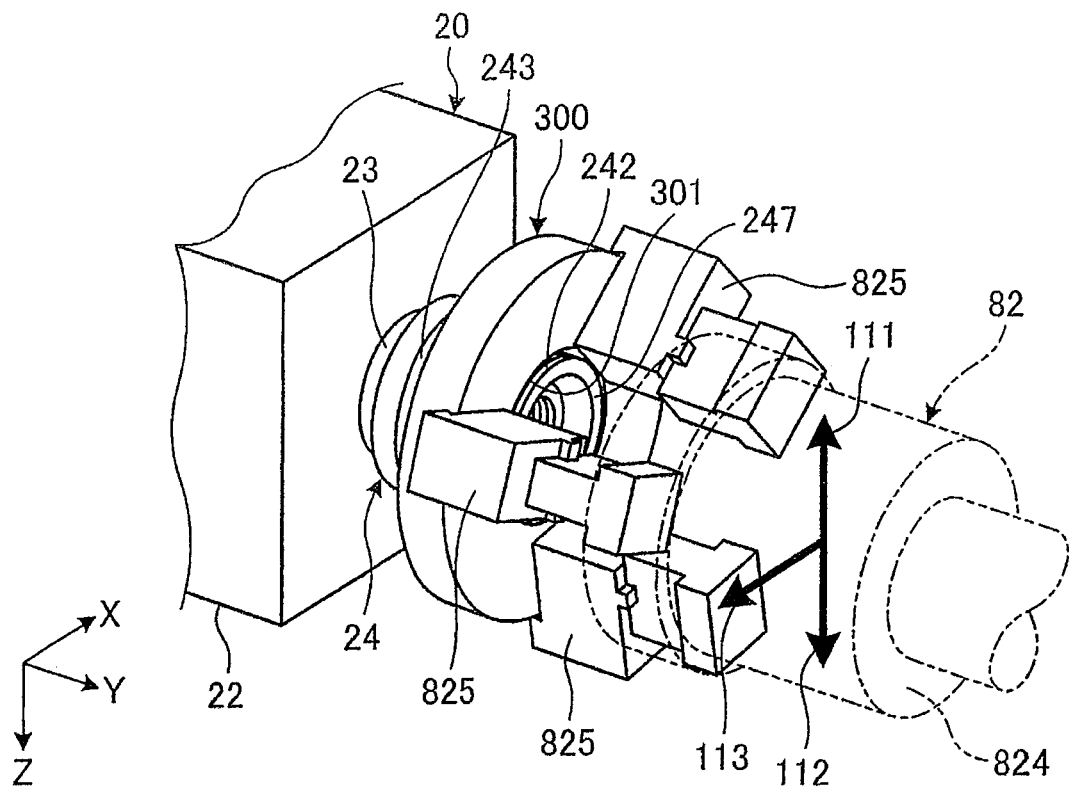
FIG. 20 is another perspective view illustrating the manner in which the boss is inserted into the opening in the jig in the position calculating operation for calculating the position of the central axis of the mount of the blade changer unit according to the second embodiment.
Figure 21:
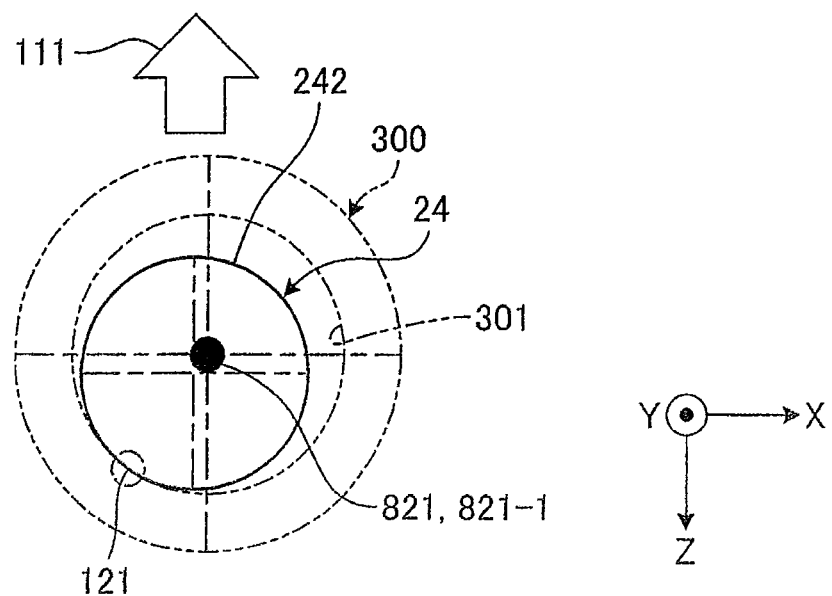
FIG. 21 is a view schematically illustrating the manner in which an inner circumferential surface of the jig that defines the opening is held in contact with an outer circumferential surface of the boss at a first contact point in the position calculating operation for calculating the position of the central axis of the mount of the blade changer unit according to the second embodiment.
Figure 22:
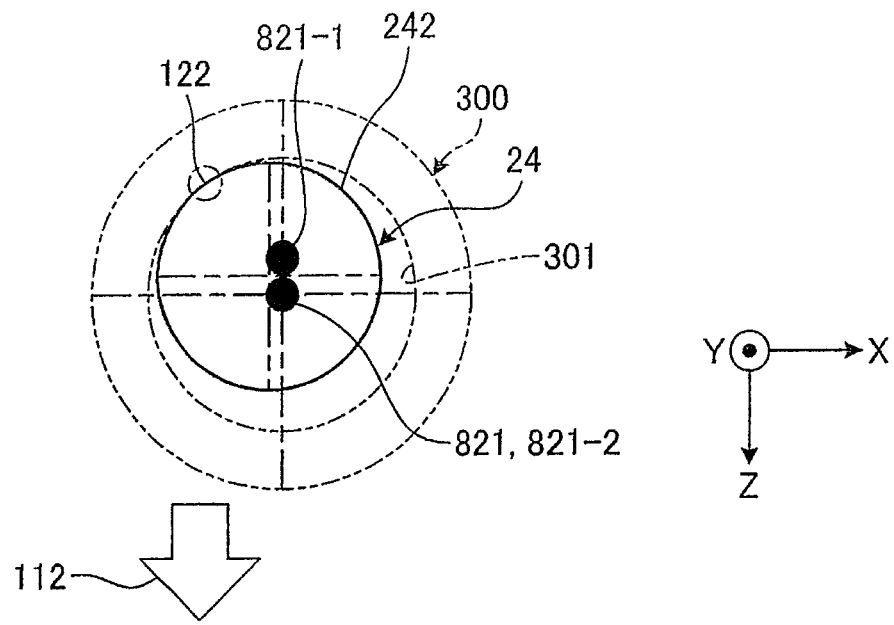
FIG. 22 is a view schematically illustrating the manner in which the inner circumferential surface of the jig that defines the opening is held in contact with the outer circumferential surface of the boss at a second contact point in the position calculating operation for calculating the position of the central axis of the mount of the blade changer unit according to the second embodiment.
Figure 23:
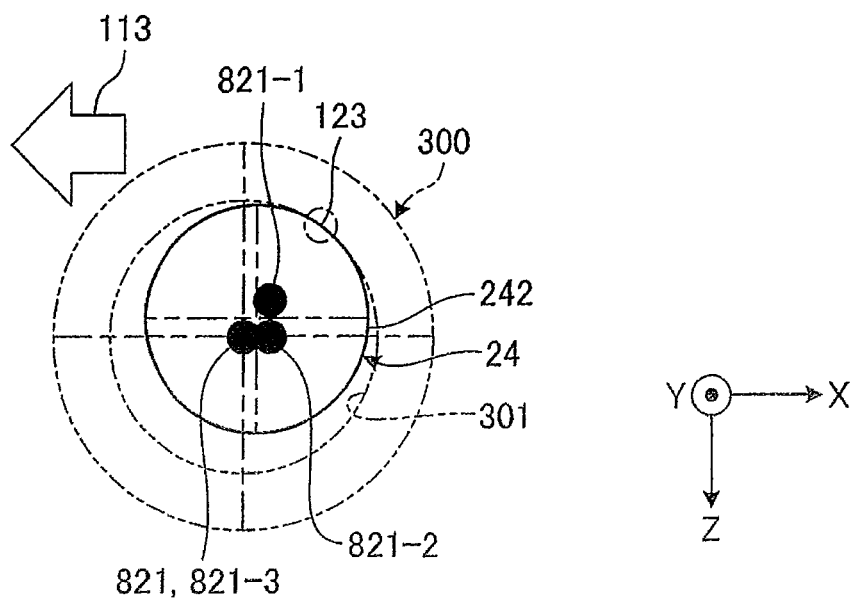
FIG. 23 is a view schematically illustrating the manner in which the inner circumferential surface of the jig that defines the opening is held in contact with the outer circumferential surface of the boss at a third contact point in the position calculating operation for calculating the position of the central axis of the mount of the blade changer unit according to the second embodiment.
Figure 24:
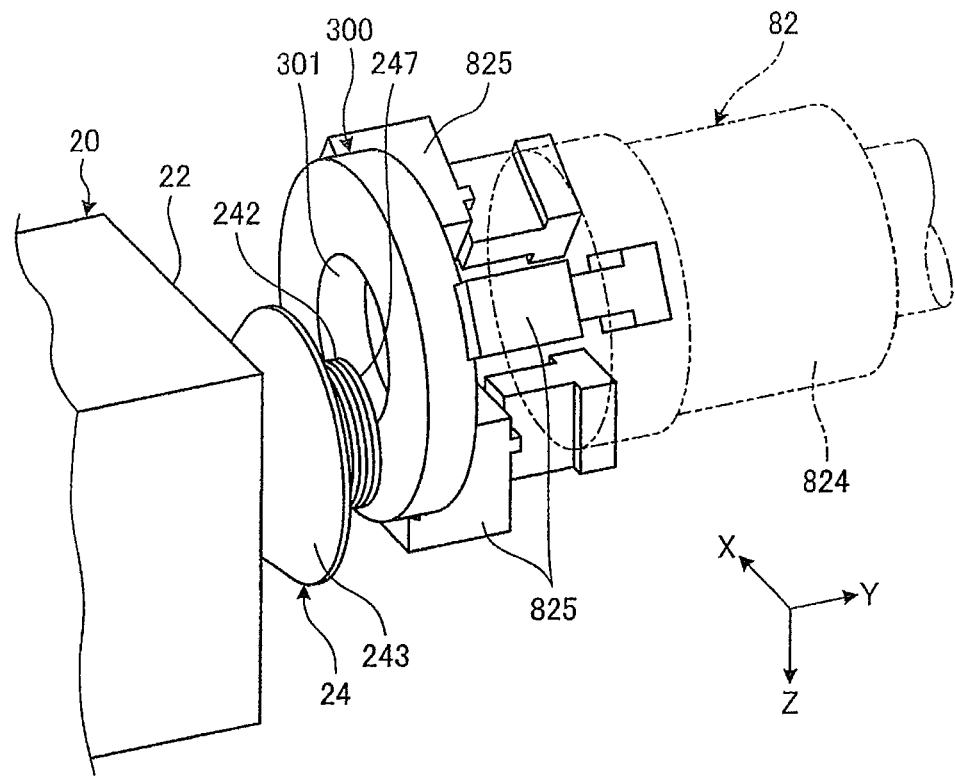
FIG. 24 is a perspective view illustrating the manner in which the jig and a distal end face of the boss are held in contact with each other in a position calculating operation for calculating the position of a distal end face of the mount of the blade changer unit according to the second embodiment.

A blade changer unit according to a second embodiment of the present invention will be described below with reference to the drawings. FIG. 18 illustrates in perspective the manner in which grippers of a blade chuck holds an electrically conductive jig in a position calculating operation for calculating the position of a mount of the blade changer unit according to the second embodiment of the present invention. FIG. 19 illustrates in perspective the manner in which a boss is inserted into an opening in a jig in the position calculating operation for calculating the position of the central axis of the mount of the blade changer unit according to the second embodiment. FIG. 20 illustrates in perspective the manner in which the boss is inserted into the opening in the jig in the position calculating operation for calculating the position of the central axis of the mount of the blade changer unit according to the second embodiment. FIG. 21 schematically illustrates the manner in which an edge of the jig that defines the opening is held in contact with an outer circumferential surface of the boss at a first contact point in the position calculating operation for calculating the position of the central axis of the mount of the blade changer unit according to the second embodiment. FIG. 22 schematically illustrates the manner in which the edge of the jig that defines the opening is held in contact with the outer circumferential surface of the boss at a second contact point in the position calculating operation for calculating the position of the central axis of the mount of the blade changer unit according to the second embodiment. FIG. 23 schematically illustrates the manner in which the edge of the jig that defines the opening is held in contact with the outer circumferential surface of the boss at a third contact point in the position calculating operation for calculating the position of the central axis of the mount of the blade changer unit according to the second embodiment. FIG. 24 illustrates in perspective the manner in which the jig and a distal end face of the boss are held in contact with each other in a position calculating operation for calculating the position of a distal end face of the mount of the blade changer unit according to the second embodiment. In FIGS. 18 through 24, those parts that are identical to those according to the first embodiment are denoted by identical reference characters, and will not be described in detail below.

The blade changer unit, denoted by 7, according to the second embodiment is the same as the blade changer unit 7 according to the first embodiment except that in a position calculating operation for calculating the position of the mount 24, the grippers 825 of the blade chuck 82 hold an electrically conductive jig 300 and bring the electrically conductive jig 300 into contact with the outer circumferential surface and the distal end face 247 of the boss 242, as illustrated in FIG. 18.

In the position calculating operation for calculating the position of the mount 24, the blade changer unit 7 according to the second embodiment causes the blade chuck 82 which is not gripping the cutting blade 21 removed from the cutting unit 20 to hold the jig 300, as illustrated in FIG. 18. The jig 300 is made of an electrically conductive material, i.e., metal according to the second embodiment, and is of an annular shape with an opening 301 defined centrally therein. The opening 301 has an inside diameter larger than the outside diameter of the boss 242.

According to the second embodiment, in the position calculating operation for calculating the central axis 246 of the mount 24 of the cutting unit 20 in the mounting/dismounting position, the calculator 102 of the control unit 100 controls the moving unit 84 to move the blade mounting/dismounting unit 80 to position the blade chuck 82 gripping the jig 300 in a position where the blade chuck 82 is juxtaposed in the Y-axis direction with the boss 242 of the mount 24 of the cutting unit 20 from which the fastening nut 27 and the cutting blade 21 have been removed. At this time, the calculator 102 positions the cutting unit 20 and the blade chuck 82 in a position where they are coaxial with each other on the basis of the position in the X-axis direction and the position in the Z-axis direction of the central axis 246 in the mounting/dismounting position, the positions being stored in the storage apparatus. While supplying electric power from the power supply to the grippers 825 of the blade chuck 82 gripping the jig 300, the calculator 102 controls the moving unit 84 to bring the blade chuck 82 gripping the jig 300 along the Y-axis direction closely to the cutting unit 20, insert the boss 242 into the opening 301 in the jig 300, as illustrated in FIG. 19, and stop the blade chuck 82 in a position where the mount 24 and the jig 300 are spaced from each other and out of contact with each other.

While supplying electric power from the power supply to the grippers 825 of the blade chuck 82 gripping the jig 300, the calculator 102 controls the moving unit 84 to move the blade chuck 82 gripping the jig 300 successively in the first direction 111, the second direction 112, and the third direction 113 that are perpendicular to the central axis 821, in the same manner as with the first embodiment, as illustrated in FIG. 20.

When the moving unit 84 moves the blade chuck 82 in the first direction 111, as illustrated in FIG. 21, an inner circumferential surface of the jig 300 that defines the opening 301 contacts the outer circumferential surface of the boss 242 at the first contact point 121. As with the first embodiment, the calculator 102 calculates the position in the X-axis direction and the position in the Z-axis direction of the central axis 821-1 at the time the inner circumferential surface of the jig 300 that defines the opening 301 has contacted the outer circumferential surface of the boss 242 at the first contact point 121, and temporarily stores the calculated positions in the storage apparatus. In FIGS. 21, 22, and 23, the outer circumferential surface of the boss 242 is schematically indicated by a solid-line circle, whereas an outer profile of the jig 300 is schematically indicated by two-dot-dash-line circles.

While supplying electric power from the power supply to the grippers 825 of the blade chuck 82 gripping the jig 300, the calculator 102 controls the moving unit 84 to move the blade chuck 82 gripping the jig 300 in the second direction 112. Then, as illustrated in FIG. 22, the inner circumferential surface of the jig 300 that defines the opening 301 contacts the outer circumferential surface of the boss 242 at the second contact point 122. As with the first embodiment, the calculator 102 calculates the position in the X-axis direction and the position in the Z-axis direction of the central axis 821-2 at the time the inner circumferential surface of the jig 300 that defines the opening 301 has contacted the outer circumferential surface of the boss 242 at the second contact point 122, and temporarily stores the calculated positions in the storage apparatus.

While supplying electric power from the power supply to the grippers 825 of the blade chuck 82 gripping the jig 300, the calculator 102 controls the moving unit 84 to move the blade chuck 82 gripping the jig 300 in the third direction 113. Then, as illustrated in FIG. 23, the inner circumferential surface of the jig 300 that defines the opening 301 contacts the outer circumferential surface of the boss 242 at the third contact point 123. As with the first embodiment, the calculator 102 calculates the position in the X-axis direction and the position in the Z-axis direction of the central axis 821-3 at the time the inner circumferential surface of the jig 300 that defines the opening 301 has contacted the outer circumferential surface of the boss 242 at the third contact point 123, and temporarily stores the calculated positions in the storage apparatus.

As with the first embodiment, the calculator 102 calculates the position in the X-axis direction and the position in the Z-axis direction of the center of a circle passing through the central axes 821-1, 821-2 and 821-3 as the position in the X-axis direction and the position in the Z-axis direction of the central axis 246 of the boss 242 of the mount 24 of the cutting unit 20, and stores the calculated positions as the position in the X-axis direction and the position in the Z-axis direction of the central axis 246 of the boss 242 of the mount 24 of a new cutting unit 20 in the storage apparatus. In this manner, in the position calculating operation for calculating the central axis 246 of the mount 24, the calculator 102 calculates the position in the X-axis direction and the position in the Z-axis direction of the central axis 246 of the boss 242 of the mount 24 from the positions in the X-axis direction and the positions in the Z-axis direction of the central axes 821-1, 821-2 and 821-3 as represented by coordinates where the conduction detecting unit 92 has detected electric conduction at the time the jig 300 contacts the outer circumferential surface of the boss 242 of the mount 24 at the three contact points 121, 122 and 123 as illustrated in FIGS. 21, 22, and 23. According to the second embodiment, in the position calculating operation for calculating the central axis 246 of the mount 24, the calculator 102 brings the jig 300 into contact with the outer circumferential surface of the boss 242 of the mount 24 at the three contact points 121, 122 and 123. According to the present invention, however, the jig 300 may be brought into contact with the outer circumferential surface of the boss 242 of the mount 24 at at least three contact points.

According to the second embodiment, in the position calculating operation for calculating the position of the distal end face 247 of the boss 242 of the mount 24 of the cutting unit 20 in the mounting/dismounting position, the calculator 102 of the control unit 100 controls the moving unit 84 to move the blade mounting/dismounting unit 80 to position the blade chuck 82 gripping the jig 300 in a position where the jig 300 is juxtaposed in the Y-axis direction with the distal end face 247 of the boss 242 of the mount 24 of the cutting unit 20 from which the fastening nut 27 and the cutting blade 21 have been removed.

While supplying electric power from the power supply to the grippers 825 of the blade chuck 82, the calculator 102 controls the moving unit 84 to bring the blade chuck 82 gripping the jig 300 along the Y-axis direction closely to the distal end face 247 of the boss 242 of the mount 24 of the cutting unit 20 from which the fastening nut 27 and the cutting blade 21 have been removed.

Then, as illustrated in FIG. 24, the jig 300 contacts the distal end face 247 of the boss 242. As with the first embodiment, the calculator 102 calculates the position in the Y-axis direction of the distal end face 247 of the boss 242 of the mount 24 of a new cutting unit 20, and stores the calculated position in the storage apparatus. In the position calculating operation for calculating the position of the distal end face 247 of the boss 242 of the mount 24, the calculator 102 thus calculates the position in the Y-axis direction of the distal end face 247 of the boss 242 of the mount 24 from the position in the Y-axis direction as represented by coordinates where the conduction detecting unit 92 has detected electric conduction at the time the jig 300 contacts the distal end face 247 of the boss 242 of the mount 24 at one contact point.

According to the second embodiment, in the position calculating operation for calculating the position of the distal end face 247 of the boss 242 of the mount 24, the calculator 102 brings the jig 300 into contact with the distal end face 247 of the boss 242 of the mount 24 at one contact point. According to the present invention, however, the jig 300 may be brought into contact with the distal end face 247 of the boss 242 of the mount 24 at at least one contact point. Then, the mounting/dismounting controller 103 of the control unit 100 controls the blade mounting/dismounting unit 80 to align the central axis 821 of the blade chuck 82 with the central axis 246 of the mount 24 on the basis of the calculated position in the X-axis direction and the calculated position in the Z-axis direction of the central axis 246 and the position in the Y-axis direction of the distal end face 247 of the boss 242, whereupon cutting blades 21 are dismounted and mounted.

The blade changer unit 7 according to the second embodiment can easily grasp the position where the jig 300 gripped by the grippers 825 and the mount 24 contact each other on the basis of the detection signals from the conduction detecting unit 92 that are produced when the mount 24 is supplied with electric power from the power supply through the jig 300, the grippers 825 of the blade chuck 82, and the spindle 23. As a result, the blade changer unit 7 according to the second embodiment is able to determine with ease the position of the mount 24 on which to mount a cutting blade 21.

[First Modification]

Figure 25:
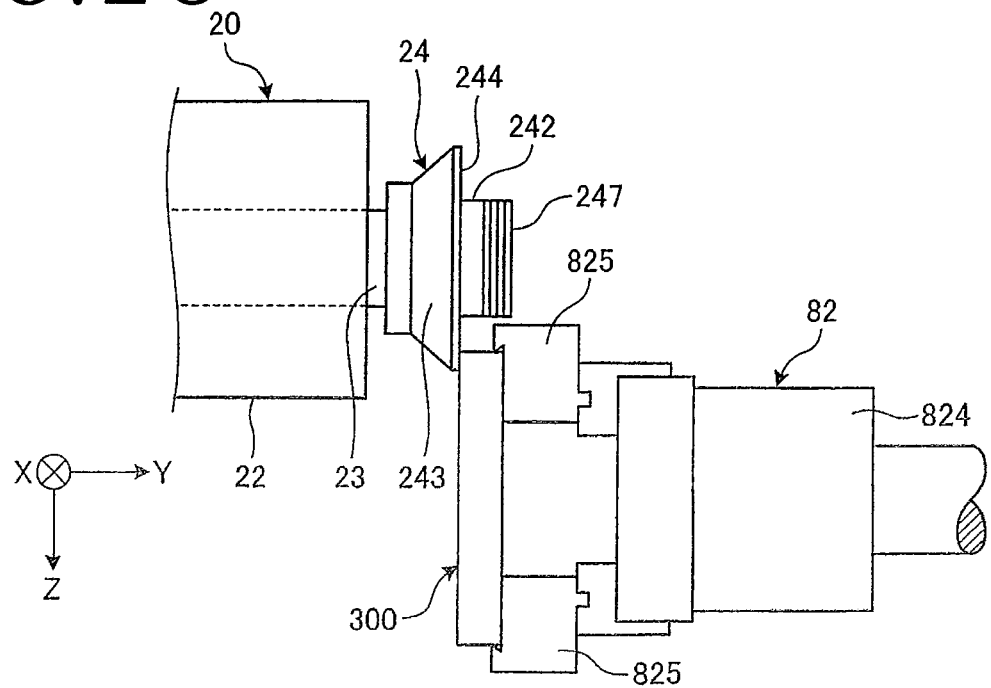
FIG. 25 is a side elevational view illustrating the manner in which a jig gripped by a blade chuck and a bearing flange of a mount are held in contact with each other in a position calculating operation for calculating the position of a distal end face of the mount of a blade changer unit according to a first modification of the second embodiment.

A blade changer unit according to a first modification of the second embodiment will hereinafter be described below with reference to the drawings. FIG. 25 illustrates in side elevation the manner in which a jig gripped by a blade chuck and a bearing flange of a mount are held in contact with each other in a position calculating operation for calculating the position of a distal end face of the mount of the blade changer unit according to the first modification of the second embodiment. In FIG. 25, those parts of the blade changer unit according to the first modification which are identical to those of the blade changer unit according to the second embodiment are denoted by identical reference characters, and will not be described in detail below.

The blade changer unit, denoted by 7, according to the first modification of the second embodiment is the same as the blade changer unit 7 according to the second embodiment except that a position calculating operation for calculating the position of the distal end face 247 of the boss 242 of the mount 24 in a position calculating operation for calculating the position of the mount 24 is different from the position calculating operation according to the second embodiment. As illustrated in FIG. 25, in the position calculating operation for calculating the position of the distal end face 247 of the boss 242 of the mount 24 in the position calculating operation for calculating the position of the mount 24, the blade changer unit 7 according to the first modification of the second embodiment brings the jig 300 gripped by the grippers 825 of the blade chuck 82 into contact with the outer edge portion 244 of the bearing flange 243 of the mount 24 of the cutting unit 20 in the mounting/dismounting position, calculates the position in the Y-axis direction of the outer edge portion 244 of the bearing flange 243, and calculates the position in the Y-axis direction of the distal end face 247 of the boss 242.

The blade changer unit 7 according to the first modification of the second embodiment, as with the second embodiment, can easily grasp the position where the jig 300 gripped by the grippers 825 and the mount 24 contact each other on the basis of the detection signals from the conduction detecting unit 92 that are produced when the mount 24 is supplied with electric power from the power supply through the jig 300, the grippers 825 of the blade chuck 82, and the spindle 23. As a result, the blade changer unit 7 according to the first modification of the second embodiment, as with the second embodiment, is able to determine with ease the position of the mount 24 on which to mount a cutting blade 21.

[Second Modification]

Figure 26:
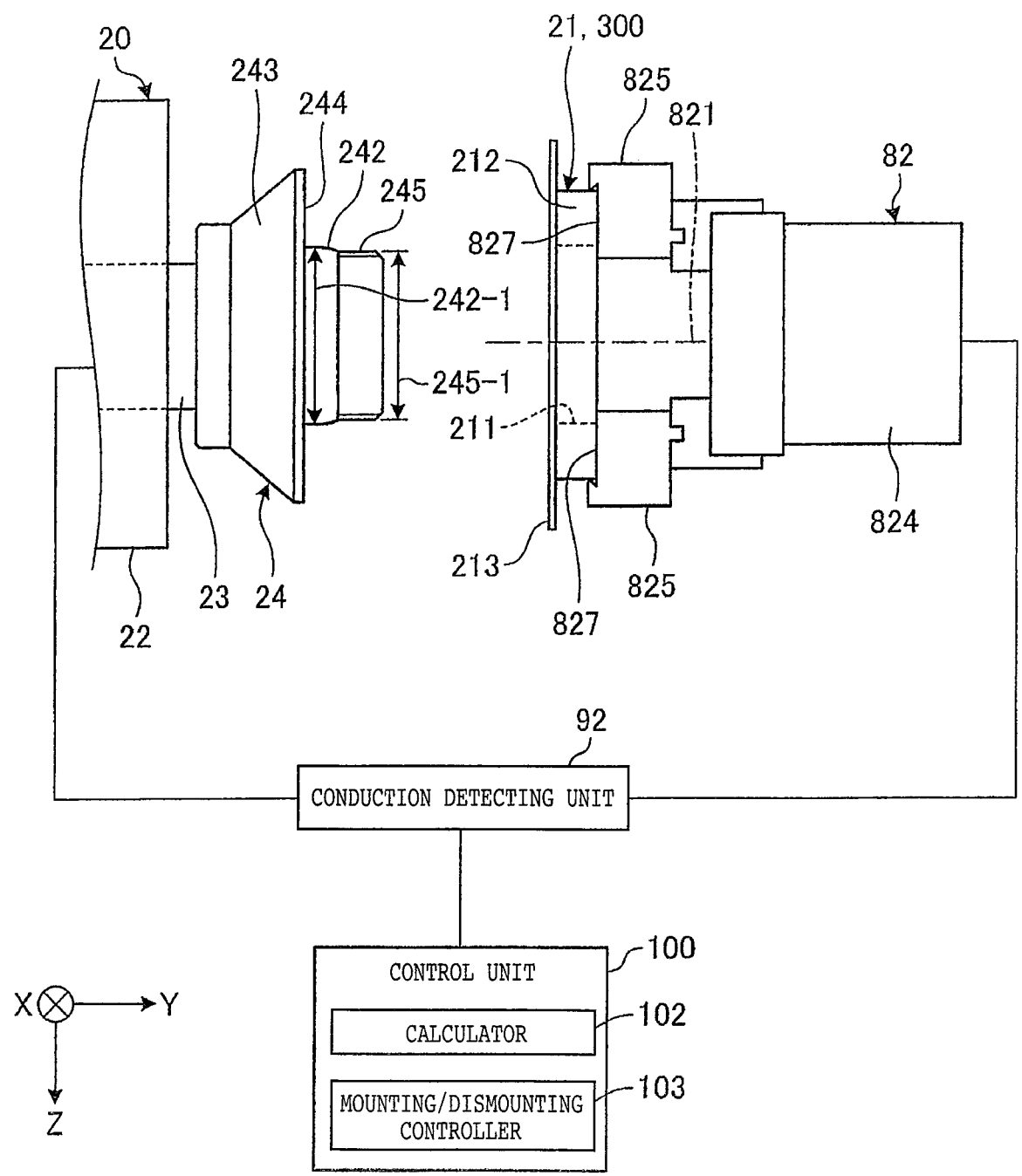
FIG. 26 is a side elevational view illustrating by way of example the structure of a position detecting unit of a blade mounting/dismounting unit of a blade changer unit according to a second modification of the second embodiment.
Figure 27:
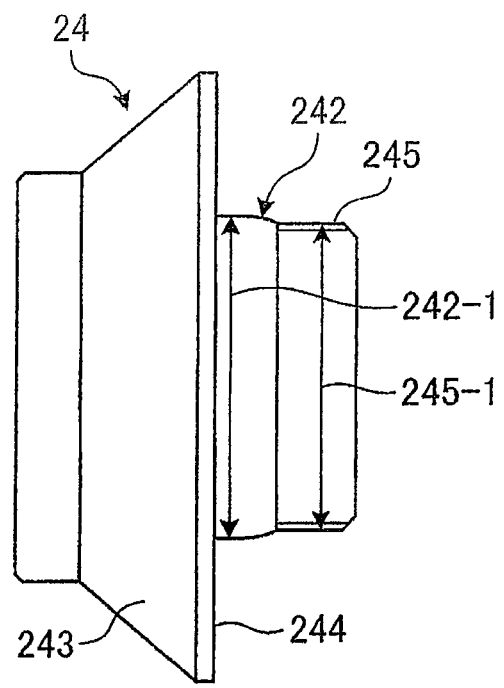
FIG. 27 is a side elevational view of a mount of a cutting apparatus incorporating the blade changer unit according to the second modification of the second embodiment.
Figure 28:
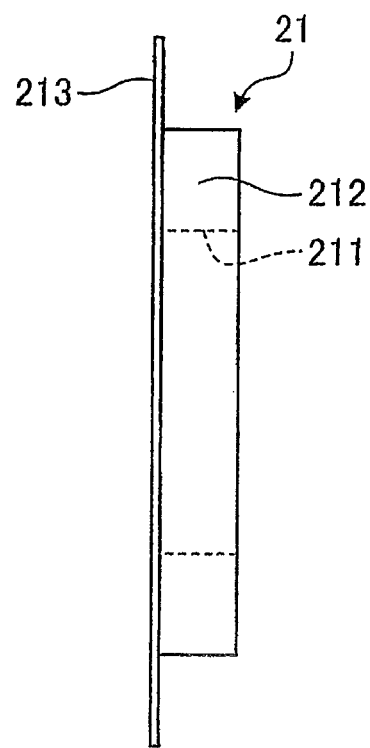
FIG. 28 is a side elevational view of a cutting blade of the cutting apparatus incorporating the blade changer unit according to the second modification of the second embodiment.
Figure 29:
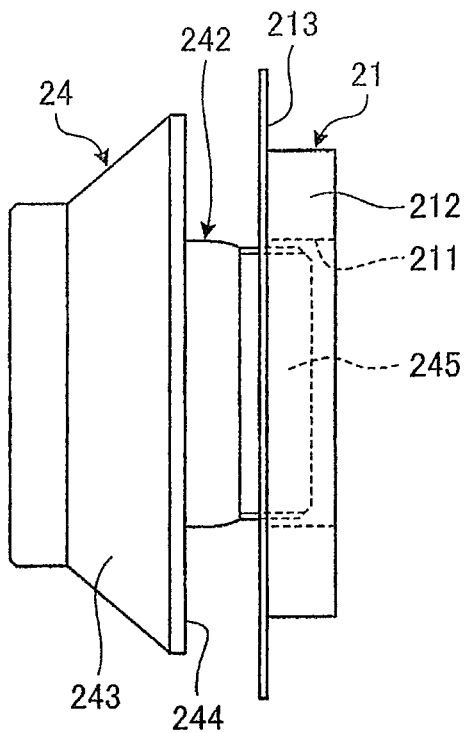
FIG. 29 is a side elevational view illustrating the manner in which a boss of the mount of the cutting apparatus incorporating the blade changer unit according to the second modification of the second embodiment is inserted in an insertion hole in the cutting blade.

A blade changer unit according to a second modification of the second embodiment will hereinafter be described below with reference to the drawings. FIG. 26 illustrates in side elevation by way of example the structure of a position detecting unit of a blade mounting/dismounting unit of the blade changer unit according to the second modification of the second embodiment. FIG. 27 illustrates in side elevation a mount of a cutting apparatus incorporating the blade changer unit according to the second modification of the second embodiment. FIG. 28 illustrates in side elevation a cutting blade of the cutting apparatus incorporating the blade changer unit according to the second modification of the second embodiment. FIG. 29 illustrates in side elevation the manner in which a boss of the mount of the cutting apparatus incorporating the blade changer unit according to the second modification of the second embodiment is inserted in an insertion hole in the cutting blade. In FIGS. 26, 27, 28, and 29, those parts of the blade changer unit according to the second modification which are identical to those of the blade changer unit according to the second embodiment are denoted by identical reference characters, and will not be described in detail below.

The blade changer unit, denoted by 7, according to the second modification of the second embodiment is the same as the blade changer unit 7 according to the second embodiment except that the cutting blade 21 as the jig 300 is gripped by the blade chuck 82, as illustrated in FIG. 26, while the position detecting operation for detecting the position of the mount 24 is carried out, and the externally threaded outer circumferential surface 245 of the boss 242 of the mount 24 has an outside diameter 245-1 smaller than an outside diameter 242-1 of an end of the boss 242, as illustrated in FIG. 27. In FIG. 26, only one blade chuck 82 is illustrated, with the selector switch 93 omitted from illustration.

According to the second modification of the second embodiment, the insertion hole 211 in the cutting blade 21 illustrated in FIG. 28 has an inside diameter substantially equal to the outside diameter 242-1 of the end of the boss 242 of the mount 24 and larger than the outside diameter 245-1 of the externally threaded outer circumferential surface 245 of the boss 242. According to the second modification of the second embodiment, in the position calculating operation for calculating the position of the central axis 246 of the boss 242 of the mount 24 in the position calculating operation for calculating the position of the mount 24, as illustrated in FIG. 29, the externally threaded outer circumferential surface 245 of the boss 242 of the mount 24 is inserted into the insertion hole 211 in the cutting blade 21 without contacting the inner circumferential surface of the cutting blade 21 that defines the insertion hole 211. Thereafter, as with the second embodiment, the cutting blade 21 is moved successively in the first direction 111, the second direction 112, and the third direction 113, and the position in the X-axis direction and the position in the Z-axis direction of the central axis 246 of the boss 242 are calculated.

Furthermore, according to the second modification of the second embodiment, in the position calculating operation for calculating the position of the distal end face 247 of the boss 242 of the mount 24 in the position calculating operation for calculating the position of the mount 24, the circular base 212 of the cutting blade 21, etc., is brought into contact with the distal end face 247 of the boss 242 or the outer edge portion 244 of the bearing flange 243, and the position in the Y-axis direction of the distal end face 247 of the boss 242 is calculated.

The blade changer unit 7 according to the second modification of the second embodiment, as with the second embodiment, can easily grasp the position where the cutting blade 21 gripped by the grippers 825 and the mount 24 contact each other on the basis of the detection signals from the conduction detecting unit 92 that are produced when the mount 24 is supplied with electric power from the power supply, not illustrated, through the cutting blade 21, the grippers 825 of the blade chuck 82, and the spindle 23. As a result, the blade changer unit 7 according to the first modification of the second embodiment, as with the first embodiment, is able to determine with ease the position of the mount 24 on which to mount a cutting blade 21.

Furthermore, since the blade changer unit 7 according to the second modification of the second embodiment determines the position of the mount 24 by bringing the cutting blade 21 gripped by the grippers 825 into contact with the mount 24, the position of the mount 24 can be determined without using a dedicated jig, and the position of the mount 24 can be determined while cutting blades 21 are being dismounted and mounted. According to the present invention, moreover, the position, described above, of the mount 24 may be calculated by bringing the jig 300 gripped by the grippers 835 of the nut holder 83 into contact with the mount 24 in the same manner as with the second embodiment and the first and second modifications thereof.

[Modification]

Figure 30:
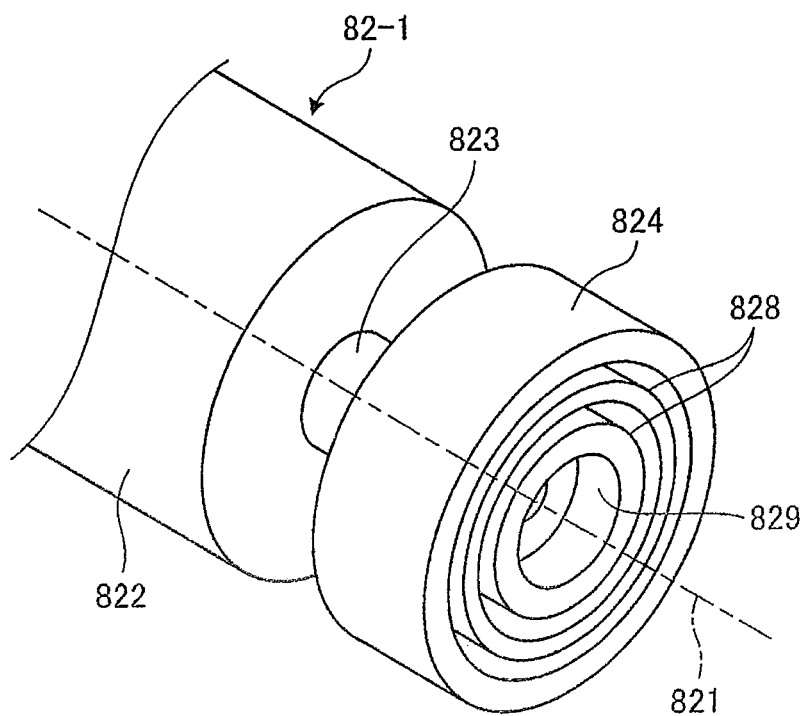
FIG. 30 is a perspective view illustrating by way of example the structure of a blade chuck of a blade mounting/dismounting unit of a blade changer unit according to a modification of the first embodiment and the second embodiment.

A blade changer unit according to a modification of the first embodiment and the second embodiment will hereinafter be described below with reference to the drawings. FIG. 30 illustrates in perspective by way of example the structure of a blade chuck of a blade mounting/dismounting unit of the blade changer unit according to the modification of the first embodiment and the second embodiment. In FIG. 30, those parts of the blade changer unit according to the modification which are identical to those of the blade changer units according to the first embodiment and the second embodiment are denoted by identical reference characters, and will not be described in detail below.

The blade changer unit, denoted by 7, according to the modification is the same as the blade changer units according to the first embodiment and the second embodiment except that the blade chuck 82 is of a different structure. As illustrated in FIG. 30, the blade chuck, denoted by 82-1, of the blade mounting/dismounting unit 80 of the blade changer unit 7 according to the modification includes a support base 824 that has an end face facing the blade holder 74 and the mount 24 of the cutting unit 20 and having two suction grooves 828 defined therein that are connected to a suction source and an entry hole 829 defined therein for receiving the boss 242 that enters the entry hole 829 when the cutting unit 20 is dismounted and mounted. The suction grooves 828 and the entry hole 829 are recessed from the end face of the support base 824.

According to the modification, the two suction grooves 828 are of an annular shape and positioned coaxially with the end face. When a negative pressure from the suction source acts in the suction grooves 828, the cutting blade 21 is held under suction on the end face of the support base 824. The entry hole 829 is defined centrally in the end face of the support base 824 coaxially therewith.

The blade changer unit 7 according to the modification is able to determine with ease the position of the mount 24 on which to mount a cutting blade 21, as with the first embodiment and the second embodiment, because the mount 24 is supplied with electric power from the power supply through the blade chuck 82-1 and the spindle 23.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A blade changer unit for mounting a cutting blade on and dismounting the cutting blade from a boss extending in an axial direction of a mount fixed to a distal end of a spindle of a processing apparatus, the cutting blade including a circular base having an insertion hole defined centrally therein and a cutting edge disposed on an outer circumferential edge portion of the circular base, the blade changer unit comprising:
    an electrically conductive holder for holding the cutting blade;
    a moving unit for moving the blade changer unit; and
    a control unit for controlling the moving unit and detecting conduction between the holder and the boss,
    wherein the control unit includes:
        a calculator for calculating a center of the mount from coordinates where the conduction between the holder and the boss is detected when the moving unit is controlled to bring the holder into contact with the mount at at least three points, and
        a mounting/dismounting controller for mounting and dismounting the cutting blade while a center of the holder is aligned with the center of the mount calculated by the calculator.

2. The blade changer unit according to claim 1, wherein
    the mount has a bearing flange projecting radially outwardly from a rear end of the boss in an axial direction thereof, for supporting the cutting blade,
    the spindle has an axial direction as a Y-axis direction,
    the calculator calculates coordinates in the Y-axis direction of the boss from the coordinates where the conduction between the holder and the boss is detected when the holder is brought into contact with the boss or a distal end of the bearing flange at at least one point, and
    the mounting/dismounting controller mounts and dismounts the cutting blade in alignment with the coordinates in the Y-axis direction of the boss calculated by the calculator.

3. A blade changer unit for mounting a cutting blade, the cutting blade including a circular base having an insertion hole defined centrally therein and a cutting edge disposed on an outer circumferential edge portion of the circular base, on and dismounting the cutting blade, from a boss extending in an axial direction of a mount fixed to a distal end of a spindle of a processing apparatus, the blade changer unit comprising:
    an electrically conductive holder for holding an electrically conductive jig having an opening larger than the boss;
    a moving unit for moving the blade changer unit; and
    a control unit for controlling the moving unit and detecting conduction between the holder and the boss,
    wherein the control unit includes:
        a calculator for calculating a center of the mount from coordinates where the conduction between the holder and the boss is detected when the moving unit is controlled to bring the jig held by the holder into contact with the mount at at least three points, and
        a mounting/dismounting controller for mounting and dismounting the cutting blade while a center of the holder is aligned with the center of the mount calculated by the calculator.

4. The blade changer unit according to claim 3, wherein
    the mount has a bearing flange projecting radially outwardly from a rear end of the boss in an axial direction thereof, for supporting the cutting blade,
    the spindle has an axial direction as a Y-axis direction,
    the calculator calculates coordinates in the Y-axis direction of the boss from the coordinates where the conduction between the holder and the boss is detected when the jig is brought into contact with the boss or a distal end of the bearing flange at at least one point, and
    the mounting/dismounting controller mounts and dismounts the cutting blade in alignment with the coordinates in the Y-axis direction of the boss calculated by the calculator.

5. The blade changer unit according to claim 3, wherein the jig includes the cutting blade.

* * * * *